United States Patent
Dickinson et al.

(10) Patent No.: US 9,164,251 B2
(45) Date of Patent: Oct. 20, 2015

(54) PREPARING AND ATTACHING A COMMUNICATION LINE TO A SUPPORTING SURFACE ON OR INSIDE OF A BUILDING

(71) Applicant: OFS Fitel, LLC, Norcross, GA (US)

(72) Inventors: Paul R Dickinson, Johns Creek, GA (US); Daniel Hendrickson, Roswell, GA (US)

(73) Assignee: OFS FITEL, LLC, Norcross, GA (US)

( * ) Notice: Subject to any disclaimer, the term of this patent is extended or adjusted under 35 U.S.C. 154(b) by 118 days.

(21) Appl. No.: 14/036,646

(22) Filed: Sep. 25, 2013

(65) Prior Publication Data

US 2014/0020815 A1 Jan. 23, 2014

Related U.S. Application Data

(62) Division of application No. 13/185,762, filed on Jul. 19, 2011, now Pat. No. 8,574,385.

(51) Int. Cl.
| | |
|---|---|
| *E04F 13/00* | (2006.01) |
| *E04F 13/08* | (2006.01) |
| *E04F 13/16* | (2006.01) |
| *C09J 5/02* | (2006.01) |
| *B29C 65/48* | (2006.01) |
| *B32B 37/12* | (2006.01) |
| *G02B 6/44* | (2006.01) |
| *B65H 49/20* | (2006.01) |
| *B65H 51/10* | (2006.01) |

(Continued)

(52) U.S. Cl.
CPC ............ *G02B 6/4466* (2013.01); *B65H 49/205* (2013.01); *B65H 51/10* (2013.01); *B65H 57/26* (2013.01); *G02B 6/4463* (2013.01); *G02B 6/46* (2013.01); *H02G 3/305* (2013.01); *B65H 2701/32* (2013.01); *G02B 6/4457* (2013.01); *Y10T 428/2938* (2015.01)

(58) Field of Classification Search
CPC .. G02B 6/4457; G02B 6/4463; G02B 6/4466; G02B 6/46; H02G 3/305; B65H 37/007; B65H 49/205; B65H 51/10; B65H 57/26; B65H 2701/32; Y10T 428/2938; C09J 5/00; C09J 5/02; C09J 5/7042; C08J 5/12; C08J 5/122; C08J 5/124; B32B 37/0053; B05D 1/28; B05D 5/10; B05C 1/0813; B05C 1/0817; B05C 1/0834; B05C 1/0865; B05C 11/025
USPC .......... 156/71, 305, 307.1, 307.3, 307.5, 314, 156/436, 555, 575, 577–579; 427/163.2, 427/207.1; 118/73, 110
See application file for complete search history.

(56) References Cited

U.S. PATENT DOCUMENTS

| | | |
|---|---|---|
| 3,111,440 A | 11/1963 | Prentice |
| 3,639,193 A | 2/1972 | Hawkins |

(Continued)

FOREIGN PATENT DOCUMENTS

DE   19533766 C1   10/1996

*Primary Examiner* — Sing P Chan
(74) *Attorney, Agent, or Firm* — Law Office of Lee Zucker

(57) ABSTRACT

A communication line such as an optical fiber or cable is attached along a wall, ceiling, trim piece, or other selected surface on or inside of a building, by paying out the fiber from an applicator tool while the tool guides the fiber along the selected surface. The outer surface of the fiber is prepared so that the fiber will be in a temporarily tacky condition when the fiber is pressed onto the selected surface by the applicator tool. The fiber is pre-coated with an adhesive that is activated by a fluid supplied by the applicator tool. As the applicator tool presses the fiber onto the selected surface, the activated adhesive coating on the fiber quickly becomes non-tacky to attach the fiber firmly to the surface.

7 Claims, 19 Drawing Sheets

(51) Int. Cl.
  *B65H 57/26*  (2006.01)
  *H02G 3/30*  (2006.01)
  *G02B 6/46*  (2006.01)

(56) References Cited

U.S. PATENT DOCUMENTS

| | | | |
|---|---|---|---|
| 4,274,709 A * | 6/1981 | Asai | ............................ 385/128 |
| 4,911,525 A | 3/1990 | Hicks et al. | |
| 4,934,312 A | 6/1990 | Koster et al. | |
| 4,950,049 A | 8/1990 | Darsey et al. | |
| 5,042,902 A | 8/1991 | Huebscher et al. | |
| 6,656,319 B1 | 12/2003 | Boyd et al. | |
| 7,112,746 B2 | 9/2006 | Tsukahara et al. | |
| 7,569,273 B2 * | 8/2009 | Bredt et al. | ................... 428/402 |
| 2006/0177634 A1 | 8/2006 | Lazar et al. | |
| 2008/0187276 A1 | 8/2008 | Roberts et al. | |
| 2012/0066987 A1 | 3/2012 | Malofsky et al. | |

* cited by examiner

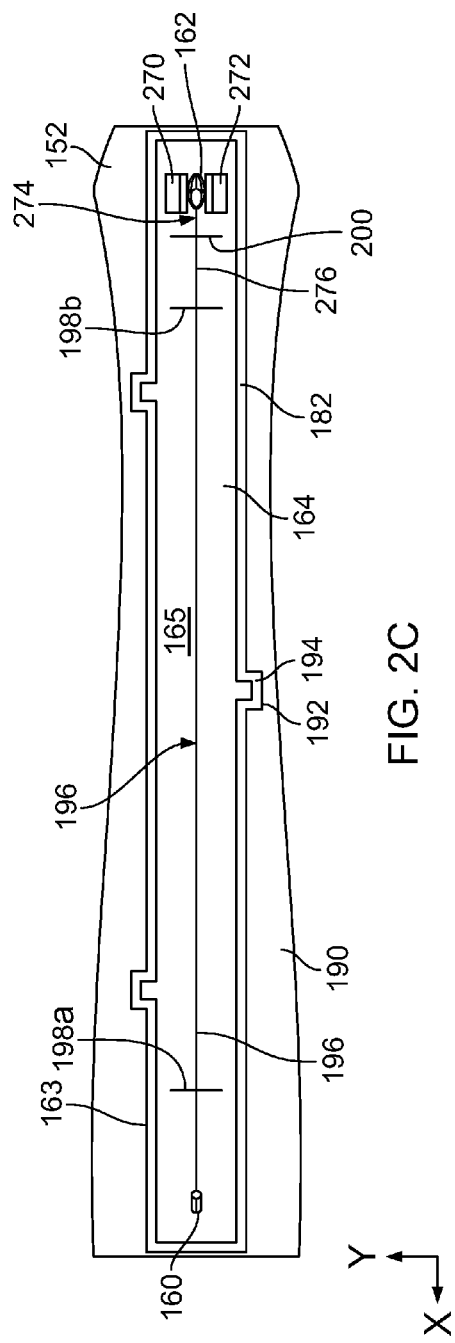
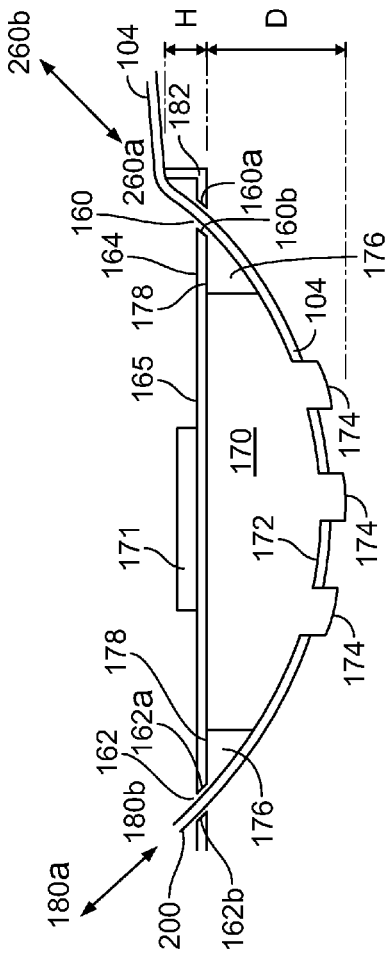
FIG. 2C
FIG. 2D

PREPARING AND ATTACHING A COMMUNICATION LINE TO A SUPPORTING SURFACE ON OR INSIDE OF A BUILDING

CROSS REFERENCE TO RELATED APPLICATIONS

This application is a divisional of U.S. patent application Ser. No. 13/185,762 filed Jul. 19, 2011. The '762 application claims priority under 35 U.S.C. §119(e) of U.S. Provisional Patent Applications No. 61/365,963 filed Jul. 20, 2010; No. 61/374,381 filed Aug. 17, 2010; and No. 61/497,871 filed Jun. 16, 2011, all of which are incorporated by reference in their entireties.

BACKGROUND

The present invention concerns a method of preparing and attaching a communication line such as an optical fiber or cable to a supporting surface on or inside of a building, for example, a wall or a ceiling.

When a communication line such as an optical fiber or cable is installed along hallway walls and inside rooms of a building to connect with individual subscriber modems and/or other components that have a fiber optical interface, the line is typically stapled onto the walls, along baseboards, and around door frames and corners so that the visual impact of the installed line is acceptable and the cost of the installation is reasonable. See, for example, U.S. Pat. No. 7,817,892 (Oct. 19, 2010). It is also known to pre-coat a length of an optical fiber with an adhesive material that is not tacky at room temperature, wind the fiber on a bobbin, and then heat the wound fiber until the adhesive becomes tacky so that the fiber windings adhere to one another and maintain a precision package from which the fiber can unwind without breakage. See U.S. Pat. No. 4,950,049 (Aug. 21, 1990). See also U.S. Pat. No. 4,911,525 (Mar. 27, 1990) which discloses an optical communication cable in the form of a flexible strip or tape, wherein one or more parallel optical fibers are fixed along a side of the strip on which an adhesive is deposited.

SUMMARY

In general, in one aspect of the invention, a communication line is attached along a target surface of a building by laying out the line from a tool. An outer surface of the line is in a temporarily tacky condition as the line is laid out along the surface. The line is in the temporarily tacky condition based at least in part on an adhesive component having been pre-applied to the outer surface of the line. The line becomes non-tacky after it has been attached.

Implementations may include one or more of the following features. The pre-applied adhesive component is activated at the tool. The pre-applied adhesive component is activated by a fluid in the tool. The line becomes non-tacky within an hour after it has been attached. The line becomes non-tacky within thirty minutes after it has been attached. The line becoming non-tacky includes the line becoming dry. The temporarily tacky condition is imparted to the line immediately prior to the line being laid out from the tool. The temporarily tacky condition is imparted to the line by applying a fluid material to an outer surface of the line. A portion of the activated adhesive component flows onto the target surface from the line after the line has been laid out. The line is pressed against the exposed surface by the tool as the line is being laid out. The target surface is on at least one of a wall, a floor, a ceiling, or a trim piece. The line is a communication line including an optical fiber or a wire. The line includes at least two layers. The line has a cross-section smaller than 1000 microns. The line has a cross-section smaller than 1500 microns. The line has a cross-section smaller than 2000 microns. The fluid includes a gel.

In general, in an aspect, an optical fiber is attached along a floor, wall, ceiling, or trim piece of a building by laying out the fiber from a tool. The fiber is laid out in a temporarily tacky condition along the floor, wall, ceiling, or trim piece. That temporarily tacky condition is achieved by an adhesive system. The fiber is rendered tacky in the tool by applying a fluid, e.g., a gel, to an outer surface of the fiber. The fiber is pressed against the floor, wall, ceiling, or trim piece by the tool as the fiber is being laid out. A portion of the adhesive system flows from the fiber onto the floor, wall, ceiling, or trim piece after being laid out. The adhesive system becomes dry within an hour after the fiber has been attached.

In general, in an aspect, at a building, an adhesive component is activated that has been pre-applied to an external surface of a dry line, to cause the external surface to become temporarily tacky. While the external surface of the line is temporarily tacky, the line is laid out along a target surface of a building. The line is enabled to become dry again while it is on the target surface.

Implementations may include one or more of the following features. A fluid is applied to the external surface. The fluid includes a gel. The target surface of the building includes at least one of a wall, a floor, a ceiling, or a trim piece. The line includes a communication line. The line includes an optical fiber. The line includes a wire. The line includes at least two layers. The pre-applied adhesive component includes a re-wettable component. The line has a cross-section smaller than 1000 microns. The line has a cross-section smaller than 1500 microns. The line has a cross-section smaller than 2000 microns.

In general, in an aspect, a cartridge includes a chamber containing a fluid material. An entry aperture in the chamber is sized to permit a communication line to be fed into the chamber. An exit aperture in the chamber is sized to permit the continuous line to be withdrawn from the chamber. The chamber is configured so that a pre-applied adhesive component on a surface of the line comes into contact with the fluid material within the chamber. The fluid material activates the pre-applied adhesive component to cause the surface of the line to be tacky after it has been withdrawn from the chamber. The cartridge is sized to be, or to be part of, a hand-held tool for attaching the line to an exposed surface of a building.

Implementations may include one or more of the following features. The chamber extends from an entry end that bears the entry aperture to an exit end that bears the exit aperture. The cartridge is elongated and configured to be hand-held either itself or as part of the tool. A guide structure guides the line within the chamber along a non-linear path from the entry aperture to the exit aperture. An exit support outside the exit aperture of the chamber supports the line as it leaves the chamber. The structure, the exit aperture, and the exit support are configured so that line extends from the guide structure through the aperture to the exit support, without touching a periphery of the aperture. The aperture is larger than a cross-section of the line by an amount that permits a selected amount of fluid material on the surface of the line to pass through the aperture with the line. The aperture has an adjustable size. The size of the aperture is adjustable by a user. The cartridge includes a mechanical element that adjusts the size of the aperture in response to movement of a corresponding mechanical element by a user of a tool in which the cartridge is held. The guide structure is configured to cause the line to leave the chamber along a path that is at an angle to an imaginary straight line between the entry aperture and the exit aperture, and the exit aperture has a non-circular shape that corresponds to the path. The exit support includes a wheel. The cartridge includes a hub for a replaceable bobbin from which the line is fed into the chamber. The cartridge includes a wall, a port through the wall, and a seal across the port that is to be removed when the cartridge is to be used. A guide structure is inserted into the chamber prior to using the apparatus. The guide structure is configured to guide the line within the chamber. The guide structure is configured to seal an access opening in a wall of the chamber when the structure is inserted into the chamber. The seal includes a peelable foil. The apparatus of claim including an applicator that receives the line after it is withdrawn from the chamber and enables a user to apply the line along an exposed surface of a building as the line is laid out from the cartridge. The applicator includes a wheel. The wheel has a peripheral groove sized to receive the line. The wheel includes a stiff, low friction material. The material includes a polyoxymethylene. A retainer holds the line in place on the periphery of the wheel. The retainer includes a retainer wheel. A support for the retainer wheel moves the retainer wheel away from the applicator when the line is to be threaded for use. The cartridge is configured to be temporarily mounted in a tool to enable a user to apply the line to an exposed surface of a building. The cartridge is disposable. The cartridge is re-usable. A wand is coupled to the cartridge or to the tool.

In general, in an aspect, a disposable or re-usable cartridge includes a chamber containing a fluid material, an entry aperture at an entry end of the chamber sized to permit a continuous communication line to be fed into the chamber, and an exit aperture at an exit end of the chamber sized to permit the continuous line to be withdrawn from the chamber. The aperture is larger than a cross-section of the line by an amount that permits a selected amount of fluid material on the surface of the line to pass through the aperture with the line. The size of the exit aperture is adjustable by a user. The chamber is configured so that a surface of the line comes into contact with the fluid material within the chamber. A guide structure guides the line within the chamber along a non-linear path from the entry aperture to the exit aperture. An exit support outside the exit aperture of the chamber supports the line as it leaves the chamber. The structure, the exit aperture, and the exit support are configured so that line extends from the guide structure through the aperture to the exit support, without touching a periphery of the aperture. A hub receives a replaceable bobbin from which the line is fed into the chamber. The chamber includes a wall, a port through the wall, and a seal across the port that is to be removed when the cartridge is to be used. An applicator wheel receives the line after it is withdrawn from the chamber and enables a user to apply the line along an exposed surface of a building as the line is laid out from the cartridge, the wheel having a peripheral groove sized to receive the line.

In general, in an aspect, at a building at which a line is to be attached to a target surface of the building, a chamber of a cartridge is temporarily opened, that contains a fluid to be applied to an external surface of the line as it is being attached. An end the line is threaded from a supply of the line that is in a dry state, through the chamber to an applicator. The chamber is closed. The line is laid out the line from the applicator onto the target surface of the building. The external surface of the line is made temporarily tacky by the fluid in the chamber. The line is allowed to dry while in place on the target surface of the building.

Implementations may include one or more of the following features. The opening of the chamber includes peeling a foil seal away from an opening in the chamber.

In general, in an aspect, a cartridge contains an activator fluid that causes an outside surface of a line to become tacky. The cartridge includes an exit aperture through which the line can be withdrawn from the cartridge. The exit aperture has a variable dimension to permit a selectable amount of the activator fluid to remain on the outside surface of the line as the line is withdrawn from the cartridge. A structure enables a user to control the variable dimension. The user can cause the variable dimension to have any one of three distinct values. The cartridge includes mechanical elements that mate with a manual control element on a tool to which the cartridge is to be coupled.

In general, in an aspect, a cartridge has an applicator wheel to be rolled along an exposed surface of a building to apply a line that has a tacky outer surface from a groove in the perimeter of the application wheel onto the exposed building surface. A retainer wheel bears against the perimeter of the applicator wheel to hold the line in the groove. A mechanism can be manipulated by a user of the tool to move the retainer wheel into and out of a position in which the retainer wheel bears against the perimeter of the application wheel.

In general, in an aspect, a line is held permanently in place along a target surface of a building by a bead of adhesive, the bead being in part integral to an outer layer of the line and in part spanning a gap between the outer layer of the line and the target surface of the building.

In general, in an aspect, a tool attaches a line to a target surface of a building. The tool has a housing through which the line passes from a supply of the line on its way to the target surface of the building. The tool includes a receptacle for a bobbin containing a supply of the line to be supplied from inside the tool. An opening permits the line alternatively to be received from outside of the tool.

In general, in an aspect, a tool applies a line to a target surface of a building. A reusable or disposable cartridge is used with the tool. The reusable or disposable cartridge contains a fluid to be applied to an outer surface of the line to activate a pre-applied adhesive coating on the outer surface to become at least temporarily tacky.

In general, in an aspect, a cartridge is loaded with a fluid to be used to cause a surface of a line, to be attached to an exposed surface of a building, to become tacky. The cartridge is temporarily sealed for later opening at the building when the line is to be attached.

In general, in an aspect, on an outer surface of a line a component is formed that is dry and can be activated to cause the outer surface to become tacky.

Implementations may include one or more of the following features. An activator fluid is applied to the dry component on the outer surface of the line to form a temporarily tacky material.

In general, in an aspect, a bobbin contains a supply of a line to be attached to a target surface of a building. The line includes a dry outer surface that has been processed so that it can be activated to become temporarily tacky for attachment to the target surface.

In general, in an aspect, a cartridge is used with a tool to attach a line to a target surface of a building. The cartridge includes a chamber that is temporarily sealed across an access opening of the chamber. A guide piece that mates with the chamber to cover the access opening and maintains the line in a predetermined contour as it is moved through the chamber when the tool is used to attach the line.

In general, in an aspect, a line is processed to make it susceptible later to being made tacky, the outer surface of the line being dry after it has been processed and before it is to be made tacky. At a time when the line is to be attached to a target surface of a building, the line is caused to be made temporarily tacky, and then the attached line is enabled to become dry.

In general, in an aspect, a line is processed to make it susceptible later to being made tacky. The outer surface of the line is dry or substantially non-tacky after it has been processed and before it is to be made tacky. At a time when the line is to be attached to a target surface, the line is caused to be made temporarily tacky, and then the attached line is enabled to become dry and adhered to the target surface.

In general, in an aspect, an adhesive system for attaching a line to a target surface includes an adhesive component pre-applied to the line. An activator component is applied to the line when the line is to be attached to the surface. The activator component is formulated to activate the adhesive component and cause it to become temporarily tacky.

Implementations may include one or more of the following features. The pre-applied adhesive component is dry. The activator component includes a fluid. The activated adhesive component forms a dry stable adhesive on the line and the target surface. The activator component includes a gel. The activator component includes a polymer. The activator component includes water or alcohol.

In general, in an aspect, at a site at which an optical fiber is to be installed on a surface of a structure, a single component adhesive or caulk is applied along a length of the outer surface of the optical fiber, and the optical fiber is laid out on the surface after the single component adhesive or caulk has been applied.

These and other aspects, features, and implementations, and combinations of them, can be expressed as methods, means and steps for performing functions, apparatus, systems, components, compositions of matter, and in other ways.

Other aspects, features, implementations, and advantages will be apparent from the following description and from the claims.

BRIEF DESCRIPTION OF THE DRAWING

FIG. 2C is a top view of a reservoir.
FIG. 2D is a schematic side view of a line guide.

DETAILED DESCRIPTION OF THE INVENTION

Figure 3:
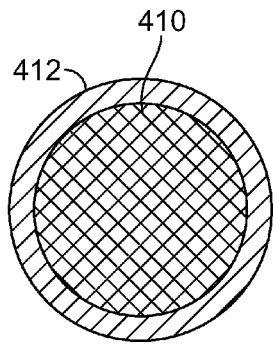
FIG. 3 is a cross-sectional view of an optical fiber.
Figure 4:
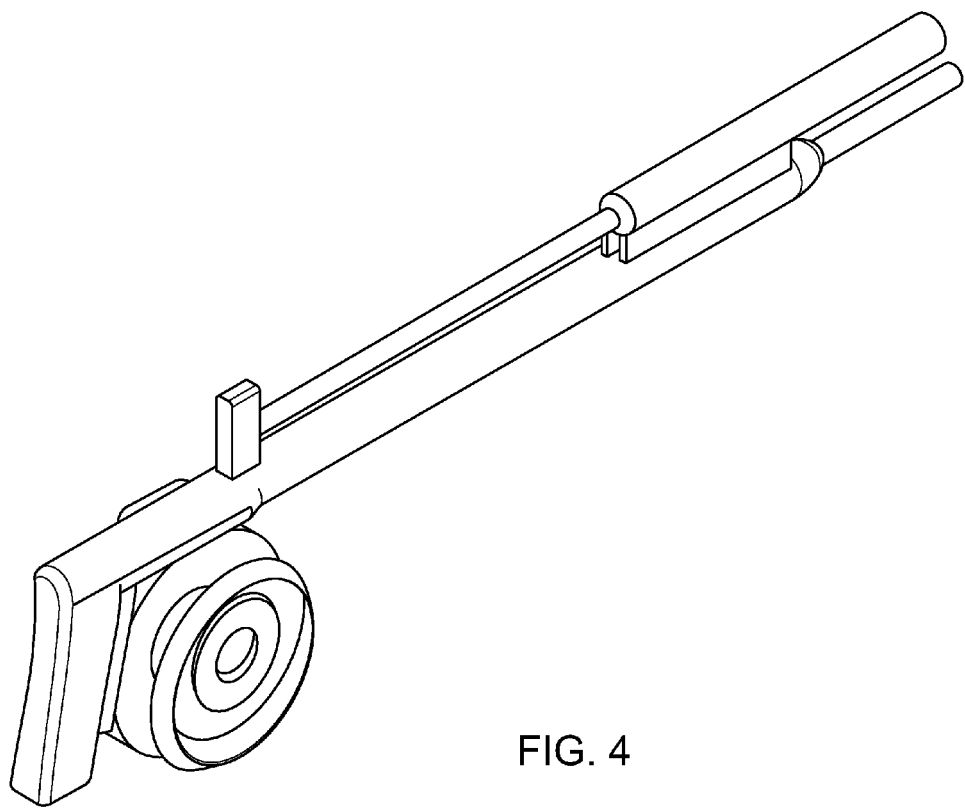
FIGS. 4, 5A, 5B, and 6 are perspective, perspective, and schematic views, respectively, of installation tools.
Figure 5A:
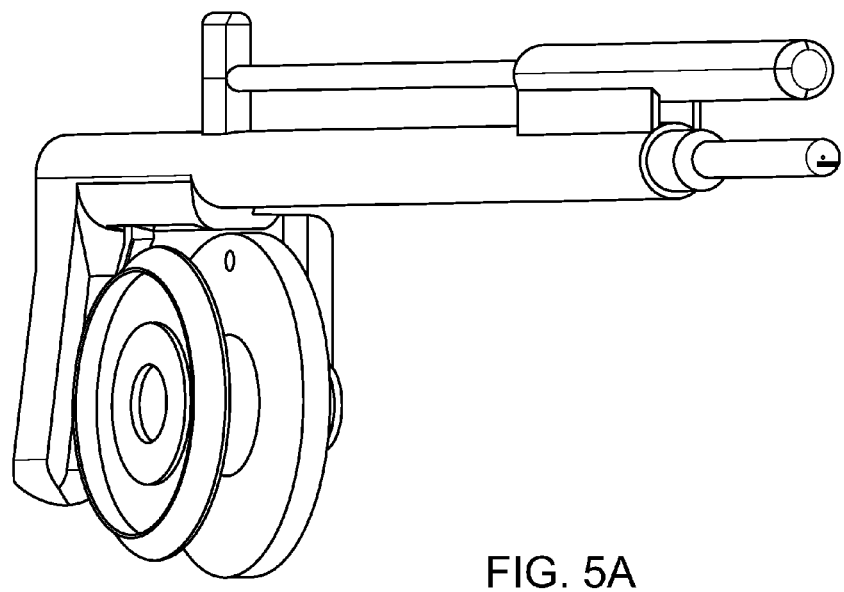
Figure 5B:
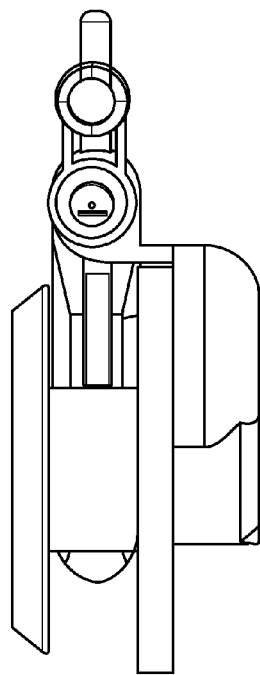
Figure 6:
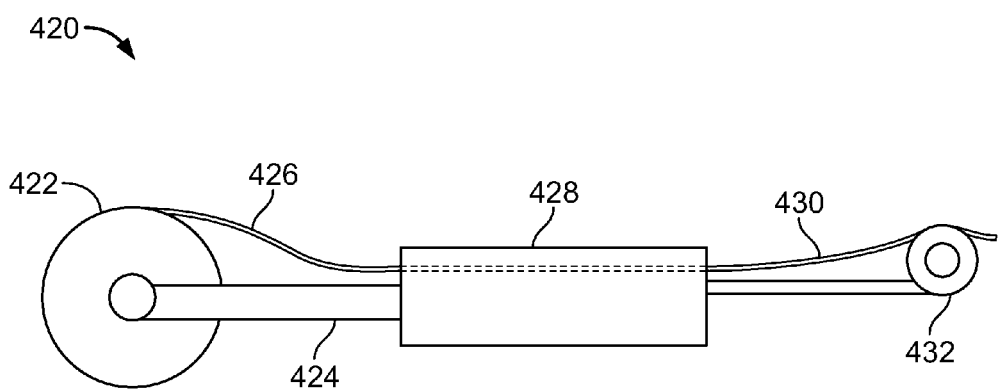

As shown in FIG. 3, in some examples described here, an optical fiber 410, e.g., a standard jacketed 900-micron optical fiber, is pre-coated with an adhesive material 412 and then attached to a wall or ceiling. In cases in which the optical fiber is clear and the adhesive is clear, the attached fiber can be invisible. In some implementations, the fiber can be painted or tinted or otherwise modified so that it could blend in with a wall or ceiling surface.

In some examples, the adhesive that is pre-coated or pre-applied on the fiber is a moisture-activated adhesive that is activated during installation. Activation occurs when the adhesive material on the fiber or cable is put into contact with an activation material such as water, alcohol, or other activators, or a combination of them. In some implementations, the activation material is benign so that if it is comes into contact with an installer's skin, or rugs or furniture, for example, it can be easily removed without injury or damage.

In such examples, the pre-coated adhesive component is a re-moistenable adhesive. When the activator touches the re-moistenable adhesive, the adhesive swells. The re-activated, swelling adhesive bonds the fiber to the wall when light pressure is applied. The tacky material that results from the combination of the adhesive and the activator gives the fiber enough grab or tack to instantly adhere to the wall when being applied by the applicator tool described later. The tacky material dries quickly to a tack-free state leaving a tack-free surface that will not attract dust, as a pressure sensitive adhesive might (resulting in a "black" dust line and making the fiber highly visible). The dried adhesive system is resistant to humidity and temperature and can be used in interior applications. The system may also contain boric acid which contributes to mold and mildew resistance as well as acting as a fire retardant.

In some arrangements, the adhesive material that has been pre-coated on the fiber or other line is dry when it leaves the factory, much like adhesive on envelopes flaps. The fiber or other line may also include an acrylic or PVC coating, or a combination of them, surrounding a fiber core, for example, in the form of a jacket.

Figure 11:
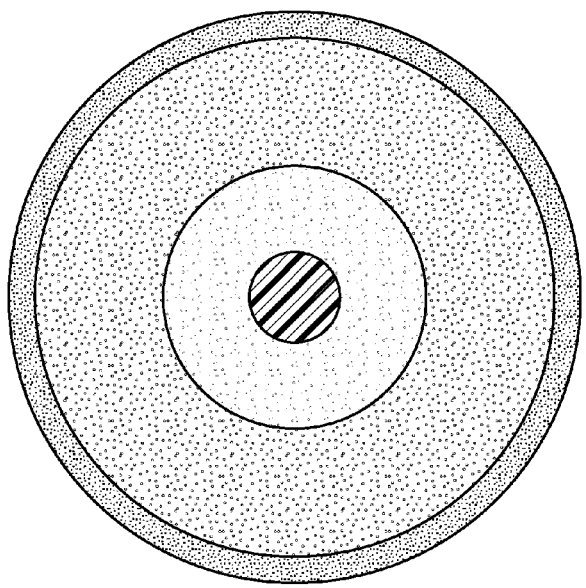
FIG. 11 is a cross-sectional view of a foam covered and adhesive covered fiber.
Figure 12:
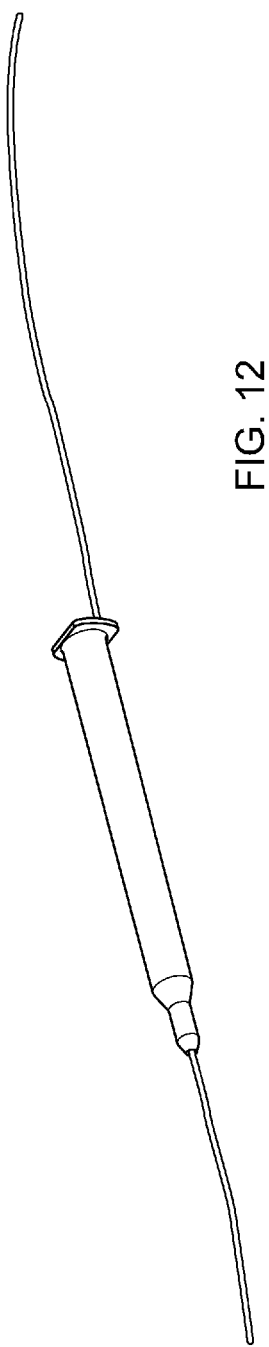
FIGS. 12 and 13 are schematic views of an installation tool.
Figure 13:
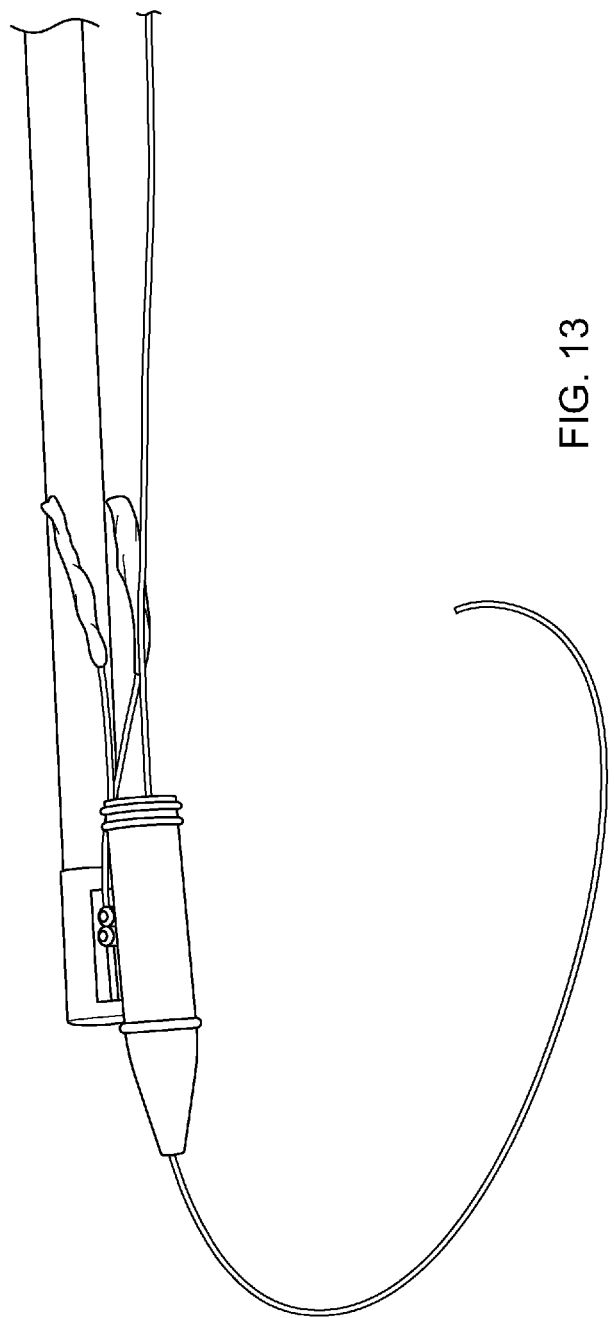

In some implementations, as shown in FIG. 11, the coating may be enveloped by a micro-cellular open cellular foam that may be impregnated with the first adhesive component, and an outer shell of a second adhesive material. When used, the foam acts as a reservoir that can provide additional tacky material for attaching the fiber to rougher and harder-to-bond surfaces. The foam layer also is useful for mounting to rough surfaces such as wood or textured walls or ceilings. In cases in which two adhesives are used, they can be the same or different, for example in the case of a two-part adhesive with one part of the adhesive contained in the foam and the other part in the activator.

Fibers as small as 250 microns in diameter may be used. Buffered optical fibers, optical fiber ribbons, small cables, and other communication lines and other kinds of lines are also contemplated.

In some implementations, the optical fiber that has been pre-coated with the adhesive material is dried after it is applied, and kept dry until it is later activated. The fiber can be provided on a roll, on a bobbin, in a cartridge, or in some other container. An installation tool (described later) holds the container during installation of the fiber on the target surface. In some examples, the pre-coated fiber passes through an activation chamber in the tool, containing water, alcohol, or another activator, or a combination of them.

In many implementations, the adhesive materials are chosen to have a long service life, on the order of 20 to 25 years, and to meet flammability and other compliance requirements.

Among the advantages of these concepts are that the fiber can be attached on demand at the installation site, the bond of the fiber to the target surface is robust, and the attached fiber can be nearly invisible. In some examples, the installer need not fix or clamp the line to the target surface using any other device other than the on demand system described here.

In some instances, the fiber would be attached at the interface between the ceiling and the wall, which reduces the need to move furniture to gain access to the area near the floor. In those instances, the installer, using an extended installation tool, could walk along and apply the fiber at the interface between the ceiling in the wall. If a mistake is made, the time needed for the adhesive to dry leaves some ability to rewind and reapply the fiber. In some instances, the fiber or line can be a tracer line bonded onto a pipe's, e.g., utility pipe's, exterior surface.

In some implementations, the installed fiber or line on the wall or ceiling, or other target surfaces or places, is encased in adhesive 360 degrees and has no areas without an adhesive.

In some examples, as shown in FIGS. 4-6 and 12-13, an adjustable length dispensing tool 420 includes a bobbin 422 of optical fiber located near the handle 424 end of the tool. The bobbin stores a length of fiber that includes a factory-applied adhesive that is activated during installation, no adhesive, or one-part of a two part adhesive. In some implementations, the tool could apply adhesive to a fiber that bears no pre-applied adhesive.

In a tool of this kind, during installation, the fiber 426 is drawn off the bobbin 422 and goes through a chamber 428 containing an adhesive or an adhesive activator. The adhesive-activated or adhesive-coated fiber 430 exits the chamber 428 and passes over a small wheel or roller 432 that is used to provide pressure against a wall or ceiling and thereby apply the adhesive-coated fiber 430 to the wall or ceiling. The device may be made shorter or longer depending on the needs of the installation.

In some implementations, the installation device could include a heating element for hot-melt adhesive (not shown) that could be applied to the cable or wire immediately before installation.

In some examples, the device 420 could include a second end that has a manual spring-loaded clip that holds pressure sensitive adhesive "buttons" that may be installed by a quick push against the ceiling or wall. These small buttons and their pressure sensitive adhesive would secure the fiber to the wall or ceiling, prevent it from moving, and reduce stress on the fiber, creating a stress point that the installer can pull against to maintain the proper radius or horizontal or vertical placement of the wire. Such buttons would be helpful for installing the fiber on irregular or non-smooth shapes and surfaces. The buttons could be designed with a variety of adhesives for different surfaces and environments such as Sheetrock® or drywall, wallpaper, cement block, stainless steel, or copper.

Figure 7:
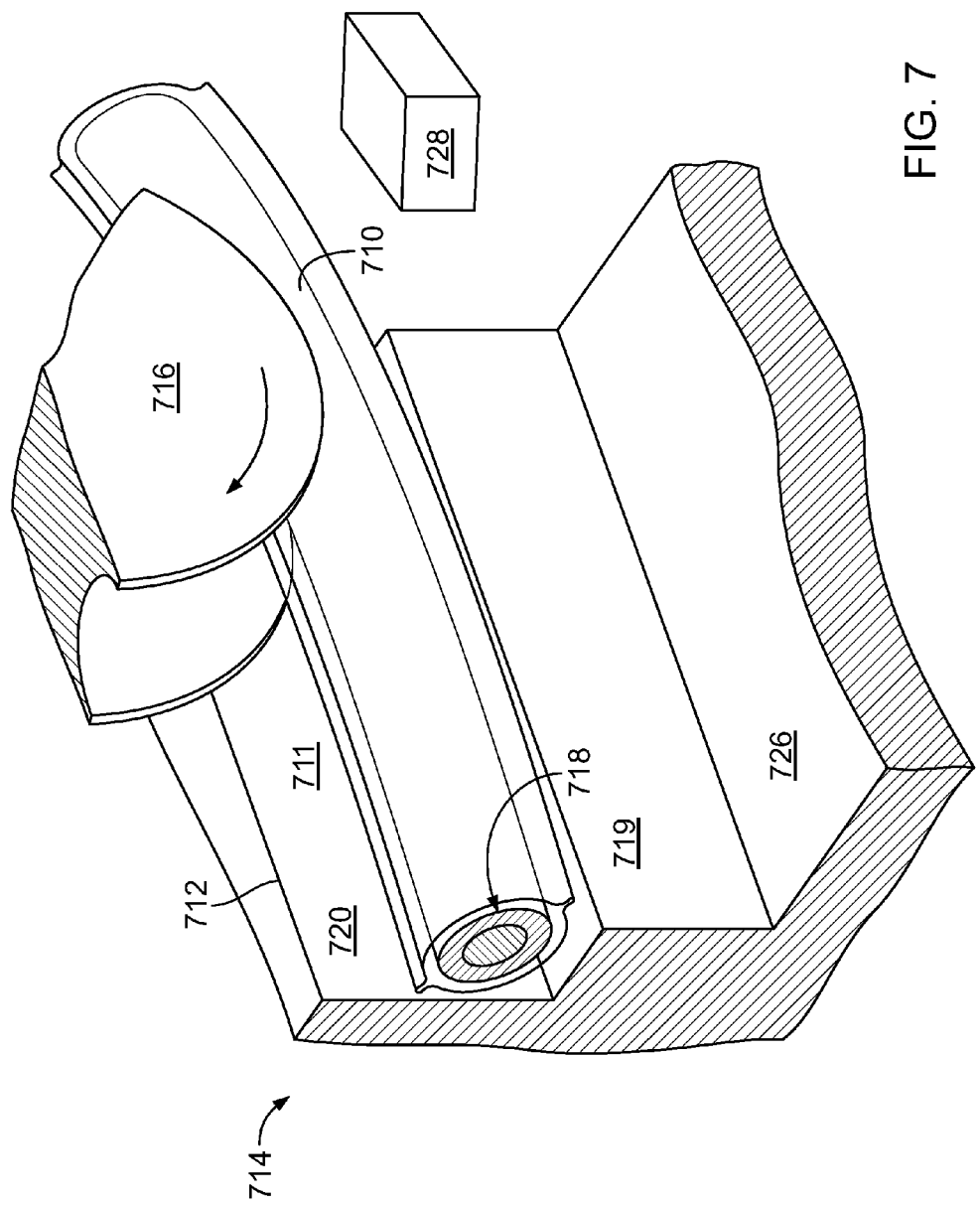
FIG. 7 is an enlarged view of an installed line.

Thus, as shown in enlarged FIG. 7, in some examples of the concepts discussed here, an optical fiber 710 is attached to a target surface 711 of a wall 712 of a building 714, by laying out the fiber from a tool 716 in which a pre-coated adhesive component on the fiber is contacted with a fluid activator to cause a tacky adhesive to form on the outer surface 718 of the fiber. The tacky adhesive sticks to the wall and, within a short time, say about 30 minutes or an hour, dries and holds the fiber 710 permanently in place. For example, the target surfaces on which the fiber 710 can be attached include baseboards 719, walls 720, door frames, interfaces or corners between ceilings and walls, floors 726, and other surfaces inside of the building 714 in order for the fiber 710 to connect optically with components or devices 728 located in the building.

Attaching the fiber in this way is, among other things, quick, easy, on-demand, cheap, secure, efficient, long-lasting, environmentally friendly, and safe. The attached fiber is held securely, is protected from damage, is not easily seen, is not visually obtrusive, and is essentially invisible in many situations. The attached fiber has a dry surface that remains clean, and can be removed easily (e.g., using water) without damage to the target surface.

A 900-micron optical fiber, for example, can be attached in corners or 90-degree interfaces between walls and baseboards or between walls and ceilings. The optical fiber can be applied at places, such as corners, that protect the optical fiber from physical contact with objects other than the wall. The fiber can be attached on demand at a rate of, say, twenty feet per minute or possibly even faster. Because the attached fiber is inconspicuous, it can be attached along a wide variety of paths or routes which can reduce the need to move obstacles such as furniture during attachment (we sometimes use the word installation instead of attachment).

The adhesive and the activator fluid can be non-toxic, for example, water-based, produce little or no odor, be easy to clean, for example, with water, and contain no (or insignificant amounts of) harsh solvents or chemicals. The tacky adhesive formed as the fiber is being attached can be quick drying, for example, in less than 30 minutes or less than an hour. During the first few minutes, while the tacky adhesive is tacky, the attached line can be repositioned, even more than once.

Many of these advantages, and others, also apply to other implementations and examples.

Our discussion sometimes describes specific implementations and examples; the implementations and examples are representative of concepts that also encompass a very broad range of other implementations and examples.

Often, when we refer to optical fiber or fiber, we mean to include fiber of any type, size, material, configuration, composition, or source, regardless of the number or type of cores, their arrangement, the inclusion of protective or decorative layers, or the number of discrete fibers within an fiber sheath, among other things.

We use the term communication line in a broad sense to include, for example, optical fiber, wire, cable, or any other line of any type, size, material, configuration, composition, or source, that is used to carry signals, such as voice, video, data, security, or electricity.

We use the term line in a broad sense to include, for example, any kind of optical or non-optical fiber, communication or non-communication line, filament, cord, cable, wire, lead, or thread, whether or not used for communication or electronic purposes. Among other things, some kinds of lines may be decorative, protective, or structural or serve any possible other kind of purpose, whether or not related to power or signaling.

The term building or structure is meant to include, for example, homes, apartments, offices, and commercial establishments, or any part of them, of any kind, size, location, construction, age, or configuration.

We use the term target surface broadly to include, for example, any surface on which a line is to be attached, including a surface of any size, shape, extent, configuration, material, temperature, use, surface color or texture, including continuous and discontinuous surfaces, interfaces between surfaces, and exposed or unexposed surfaces.

When we refer to something or a material that is tacky, we mean to refer broadly to a state of being, for example, sticky, adhesive, gummy, or adherent, among other things.

An adhesive, as we use the term, is meant to include broadly, for example, any material that is or can be made tacky either for any period (including temporarily or for a short time) and that can be changed to a state of being not tacky. The adhesive can comprise one or more components that have a broad range of densities, viscosities, tackiness, temperatures, chemical compositions, colors, and additives, for example. Some adhesives can be changed back and forth more than once between a non-tacky state and a tacky state. State changes of adhesives can be achieved in a wide variety of ways including chemically, electrically, magnetically, thermally, chemically, and combinations of those, among others.

In some examples, the adhesive system that we describe here is characterized in that an adhesive composition is applied to the line for the purpose of later adhesion to a surface or substrate. The applied adhesive composition is in a physical condition such that it has no or minimal adhesion, which allows for the facile storage, transport, and application of the line after a physical change is facilitated to the adhesive composition.

The physical change could be achieved by mixing of a heterogeneous composition, by a phase change, such as from a solid to a melt or viscoelastic state, or by a chemical change that provides for the physical or phase change, or by a combination of them. Any of the three types of changes, or combinations of them, may be accomplished by adding from an outside source an additional component A combination of the approaches may be utilized.

The adhesive system can be solvent based, water based, hot melt, single component, or multiple component.

For new construction, the activator could be water or water with a mild solvent activator. For older construction, the activator would be a stronger water and solvent mixture. For applying to rough surfaces, the fiber could be covered with foam and a heavier application of adhesive.

A wide variety of functions can be met by varying the formulation of the adhesive system including fungicidal, coloration, activation time, drying time, and surface characteristics.

Figure 1A:
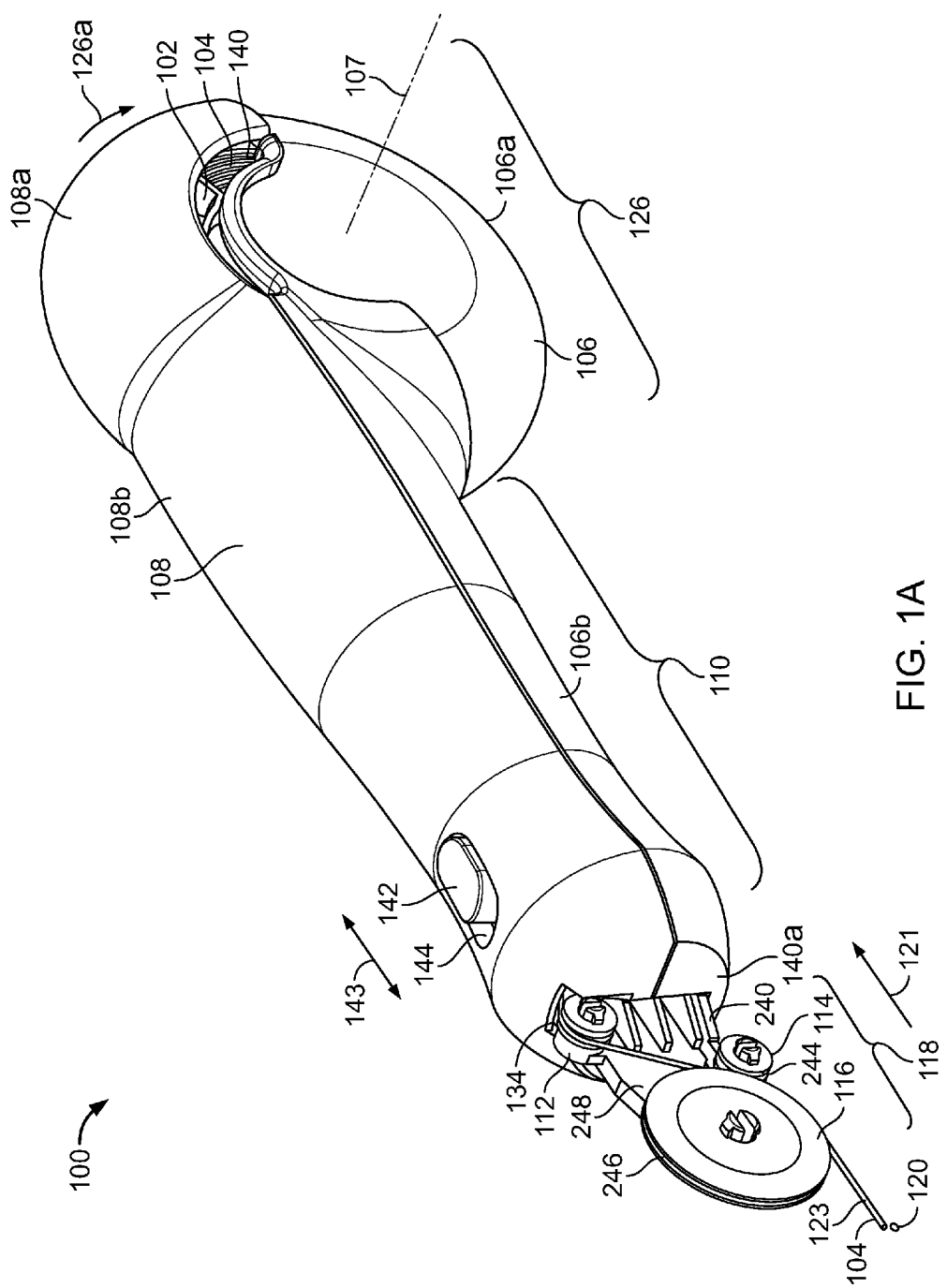
FIGS. 1A-1C are perspective views of hand-held tools.

In some implementations, the fiber could be coated with a metal or other electromagnetically heatable material or the material could be entrained in the adhesive composition and exposed to a magnetic field in the tool. All three kinds of changes mentioned above could be activated this way. Any of the changes could be achieved by coating multiple layers or by applying successive beads to the fiber that are activated by any of the three effects. Alternatively, a precoated fiber could be wetted to cause a pulling up of material from the surface of the fiber, as a third component, such as by reactivating a paint or absorbing a plasticizer from it. Referring to FIG. 1A, in some implementations, a hand-held installation tool 100 is used for delivering a line 104 that has been coated with an adhesive activator to form a tacky material on its surface, by a process that occurs within a body 110 of the tool 100 as the line is withdrawn from a bobbin 102 and fed to a rotatable applicator wheel 116, which is part of an applicator structure located at an end portion 118 of the tool 100. The line 104 wound on the bobbin can be an optical fiber or a communication line or any other kind of line, with or without a tacky exposed surface, e.g., a commercially available optical fiber or other communication line or line having a thickness of about 900 microns, in this example.

As the line 104 is pulled from the body 110 at the end 118, the bobbin 102 rotates to allow the line to pass through the body 110 to be coated with the activator, and additional rotatable support and retainer wheels 112, 114 guide the line 104 from the body 110 to the applicator wheel 116. From the applicator wheel, the line 104 can be laid along a desired path 123 on a target surface, e.g., along corners of a building wall. To attach the line to the target surface, the user presses the wheel 116 and in turn the temporarily tacky line 104 against the target surface, e.g., at a starting location 120, rotates the wheel 116 and draws the tool 100 in a direction 121 while continuing to press the wheel (and in turn the line) against the target surface, to lay the line 104 down along a desired path 123.

The tacky fluid on the line 104 adheres the line to the target surface along the path and dries (loses its tackiness) quickly after the line 104 is laid. In some implementations, the line 104 can be secured to the target surface without adding additional adhesive coatings or attaching mechanisms (e.g., pins, hooks, and etc.). The dried tacky fluid does not add substantial thickness to the thin line 104 and the attachment of the line 104 to the target surface does not substantially alter the appearance of the target surface.

Figure 1B:
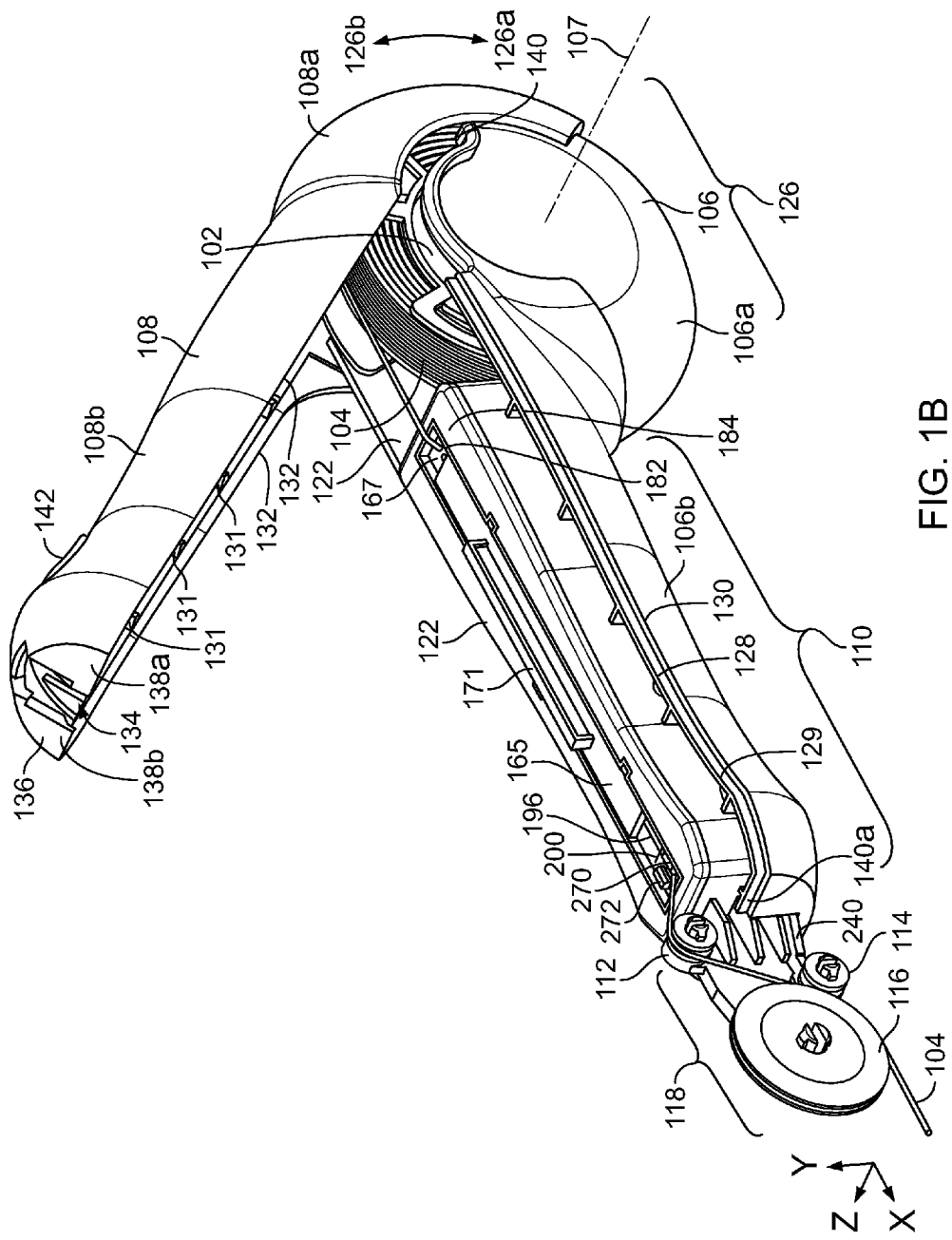
Figure 1C:
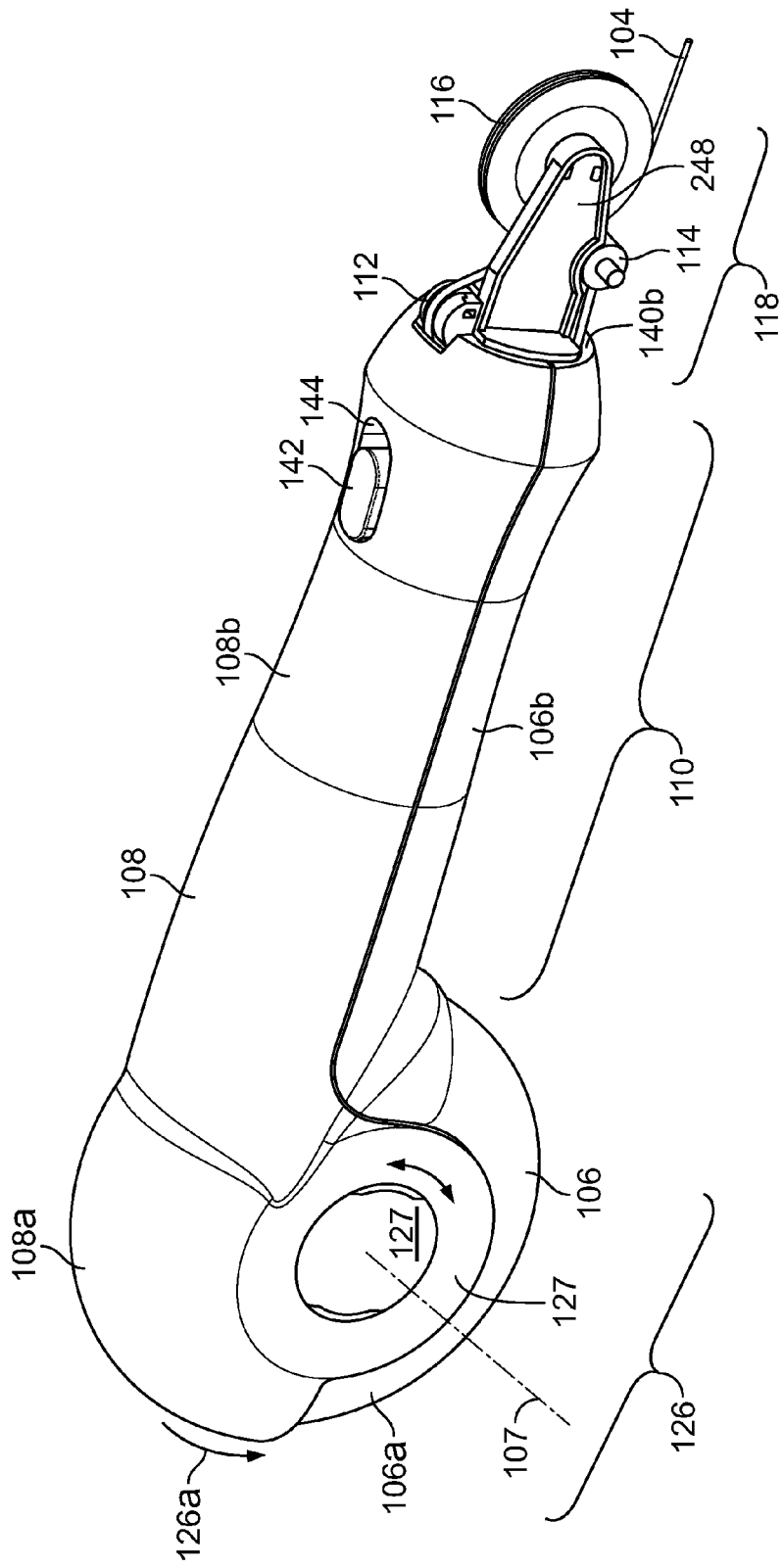

Referring to FIGS. 1A-1C, the hand-held tool 100 has a clamshell construction that includes an upper shell 108 and a lower shell 106, joined together and movable relative to each other around a pivot axis 107. The clamshell houses a cartridge 122 that contains the tacky fluid and the bobbin 102 that holds a supply of the line 104. The upper shell and the lower shell are held together at an end 125 that is opposite the applicator end 118, by a round sleeve 125 on the upper shell that mates with and rides around a round pin 127 on the lower shell.

The sleeve and pin 125, 127 are part of round cavities 106*a*, 108*a* of the shells 106, 108 that accommodate the bobbin 102 within the shells when the clamshell is closed. Arm portions 106*b*, 108*b* of the upper and lower shells engage when the clamshell is closed, form a comfortable-to-hold arm that extends between the bobbin end and the applicator end of the tool, and accommodates the cartridge 122 within the body 110. The portions of the hand-held tool 100 that are formed during manufacture are mechanically assembled to work as a clamshell. Each portion, e.g., the shells, the spool, and the rest of the cartridge, can be readily detached and/or replaced. The upper shell 108 can be disconnected from the lower shell by popping the shells apart at the sleeve and pin 125, 127.

The round portion 108*a* of the upper shell 108 has a diameter larger than a diameter of the round portion 106*a* so that the upper shell 108 can rotate about the axis 107 along the directions 126*a*, 126*b* to open or close the space within the engaged shells for the user to access and replace the cartridge and the bobbin 102.

The upper and the lower shells 108, 106 include features mate and engage to provide structural strength when the clamshell is closed. A rim 128 that extends along the front and side edges of the lower shell 106 provides an inset shelf 130 that accommodates a corresponding rim 132 when the clamshell is closed.

In addition, a far end 136 of the upper shell 108*b* includes a cutaway slot 134 bordered by side panels 138*a*, 138*b* that engage front portions 140*a*, 140*b*. When the clamshell is closed and the upper and lower shells are engaged, the slot 134 exposes the support wheel 112 and provides clearance for the line to reach the support wheel 112.

The upper shell 108 can be pressed against the lower shell 106 to close the clamshell and enclose the space within it, or propped open to expose the space housed within the shells

108, 106. In some implementations, when engaged, the upper and lower shells 108, 106 seal the internal space that contains the bobbin 102 and the cartridge 122. To seat the cartridge securely within the tool, parallel fins 129, 131 project into the inner space of the clamshell at frequent intervals to engage the outer wall of the cartridge.

In the example shown in the figures, a partial circular slot 140 is left between the round portions 106a, 108a of the shells to allow the user to, e.g., access the line 104 on the bobbin 102 without opening the shells 108, 106, or to monitor the amount of available line 104 on the bobbin 122. As explained later, in some uses, a section of line can be passed through the circular slot.

The upper shell 108 includes a control button 142 coupled to the cartridge 122. The control button 142 can be slid back and forth 143 within a recessed space 144 defined by a wall of the upper shell to mechanically adjust a related element of the cartridge 122 to control the amount of tacky fluid carried by the line 104 exiting the cartridge 122. Details of the adjustment are discussed below.

The sizes, shapes, and colors of the shells 106, 108 can be chosen based on the size of the bobbin 102 and the cartridge 122, convenience of the user, e.g., being easy to hold, or aesthetic considerations, or a combination of them. The shells can be made of molded plastic and can be light-weight.

Figure 2A:
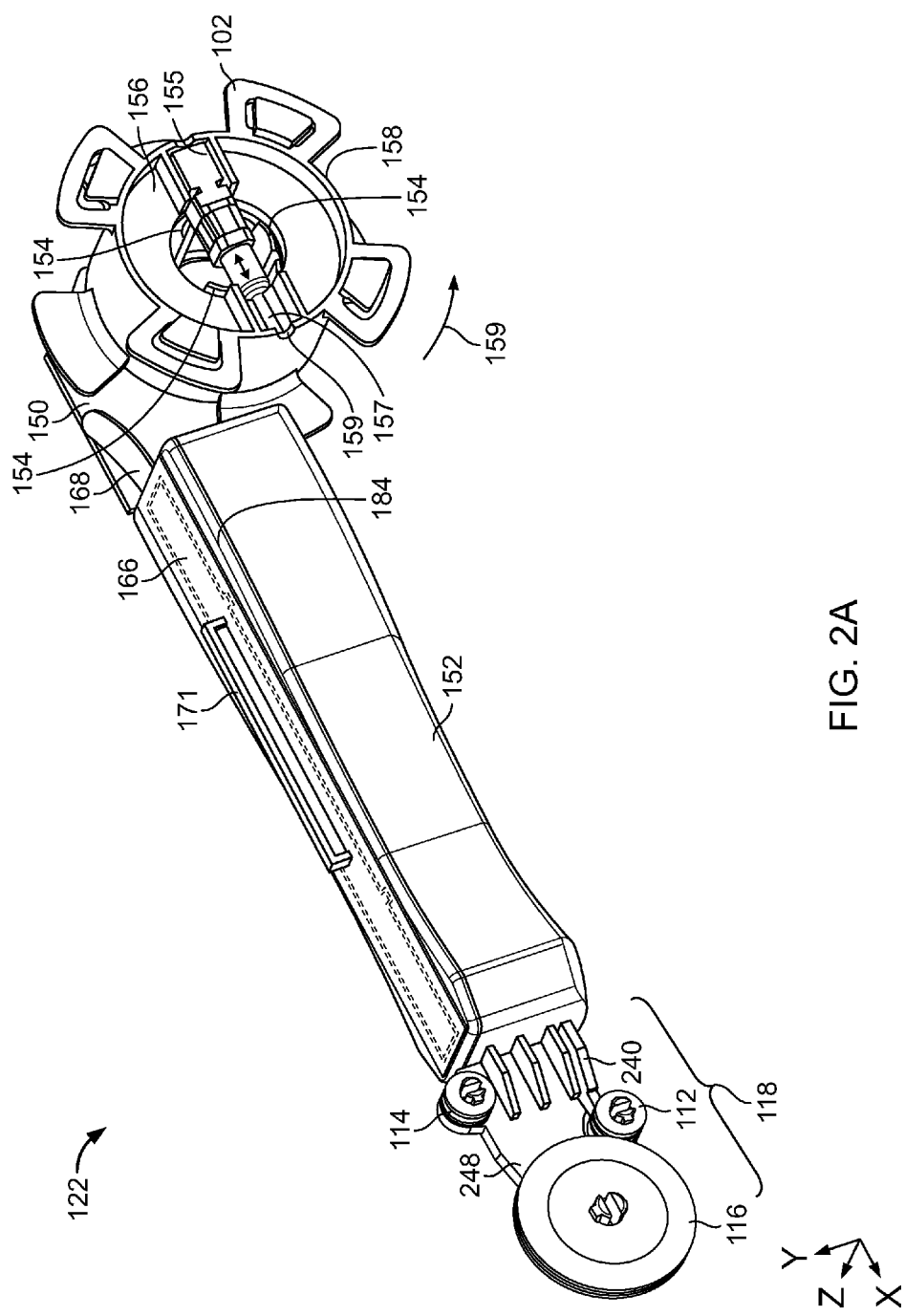
FIGS. 2A-2B are perspective views of a cartridge and bobbin.
Figure 2B:
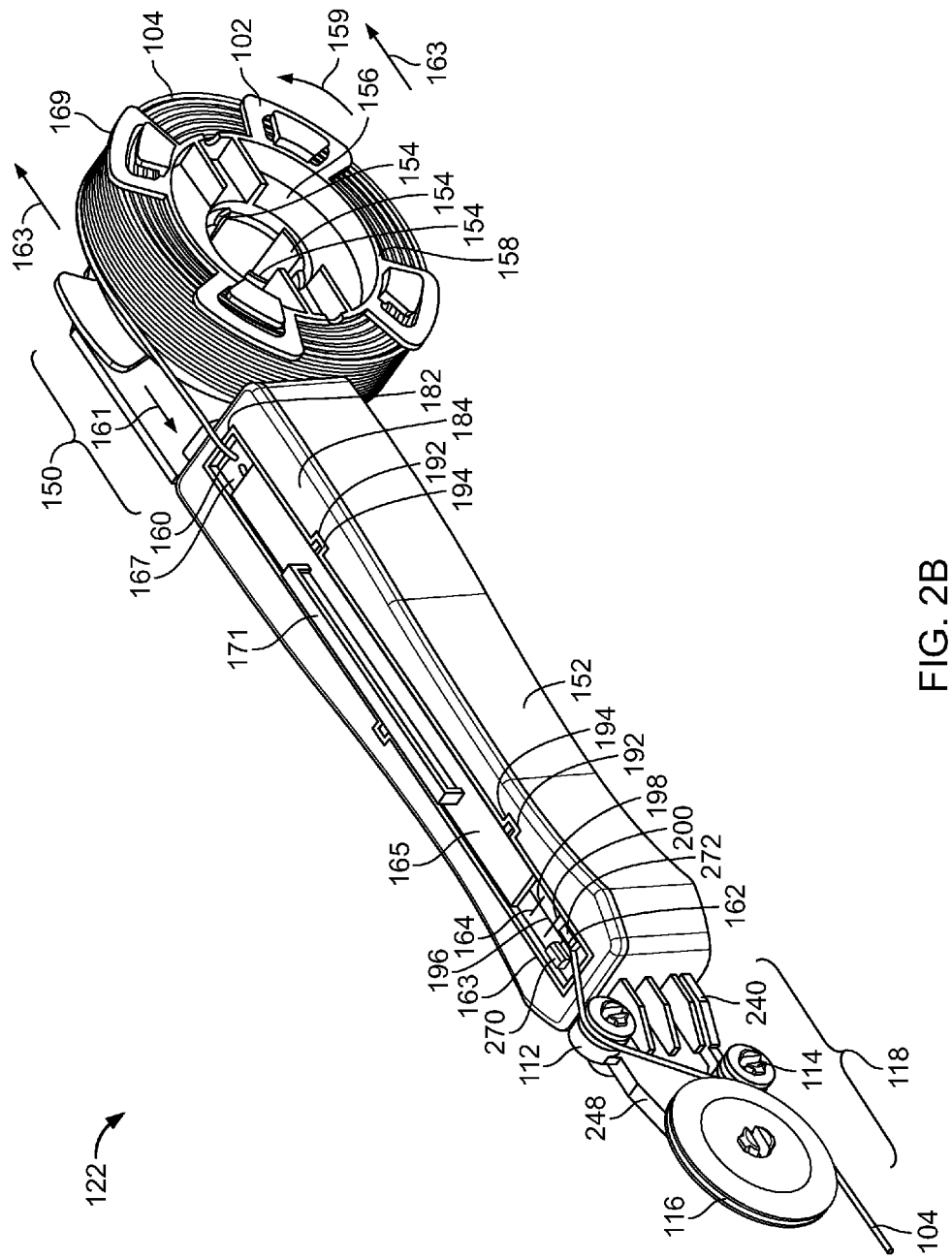

Referring to FIGS. 2A and 2B, the cartridge 122 includes a reservoir (which we also sometimes refer to as a chamber) 152 that stores an activator fluid used to activate adhesive on the outer surface of the line. At one end of the reservoir, the cartridge includes the applicator structure 118. At the other end of the reservoir, the cartridge includes a bobbin supporting structure 150.

The bobbin supporting structure 150 has three resilient axial prongs 154. The bobbin 102 is mounted on the bobbin supporting structure by pressing a central hole 155 of the bobbin over the prongs until they pop out to seat the bobbin. The bobbin can be removed by pressing in towards the axis on the three prongs and pulling the bobbin away.

The bobbin has two concentric rings that can be rotated relative to one another or locked. When the bobbin is in place, an inner ring 156 of the bobbin 102 is held tightly to the prongs 154, and an outer ring 158 of the bobbin 102 can rotate, for example, counterclockwise 159 about the locked inner ring 156 as the line 104 is delivered along the direction 161 into the reservoir. The bobbin 102 can be removed from the end portion 150, e.g., be replaced, when the line 104 runs out. Retainers 169 arranged around both sides of the bobbin keep the wound line in place and provide slots for grabbing the line when it is being stored, so that the line does not unravel.

Sometimes during installation and while the line is threaded through the reservoir and the applicator structure, the installer can open the clamshell, temporarily remove the bobbin 102 from the bobbin support structure 150, and unwind and extend the line 104 along a direction 163 opposite to the direction 161, without subjecting the line 104 to the activator fluid in the reservoir 152. By holding the line 104 at the end 118 and the cartridge 122 stationary, and by laying out on the target surface a part of the line that has been extended in direction 163, the user can preview the effect of and adjust the path of the line layout on a target surface, e.g., a building wall, before making the line tacky and attaching it to the target surface. When the installer is satisfied with the line layout, she can hold the two ends of the line layout stationary and then press the wheel 116 against the target surface, rotate the wheel 116 and move the cartridge along the direction 163 towards the temporarily removed bobbin 102 to activate the adhesive on the pre-laid line 104 and attach the line 104 to the target surface in the desired, pre-laid path.

Referring also to FIG. 2C, the reservoir 152 of the cartridge has a rectangular opening 163 in its top. The opening is covered by a lid 164, e.g., a gasket made of elastic resilient rubber-like material, that fits a top reservoir wall 184. The rectangular opening 163 has slots 192 that mate with three protrusions 194 in the lid. The gasket is attached to the top reservoir wall by mechanical engagement.

The lid 164 includes a line entry opening (which we sometimes call an aperture) 160 and a line exit opening (which we sometimes call an aperture) 162 connected by a long linear slit 196 in a recessed surface 167 of the lid. The exit opening 162 is located between two ramps 270, 272 extending above the recessed surface 167. The recessed surface of the lid is surrounded by edge walls 182 having an upper surface in the same plane as a top surface 184 of the reservoir 152. The openings 160, 162 are formed by the molding of the lid or by punching or cutting away material. The slit 196 is formed by cutting through the lid 164 without removing any lid material.

The slit 196 provides a closure on the top of the reservoir to help to retain the activator within the reservoir. The lid 164 includes two short parallel slits 198a, 198b that intersect the slit 196 perpendicularly and are separated by a distance longer than a length of a line guide 165 that is held in the reservoir (shown, e.g., in FIG. 2D). Like the slit 196, the slits 198a, 198b are also formed by cutting the surface 167 without removing any material.

When the cartridge is unpacked and prepared for use, the line is threaded on the line guide 165 and the line guide with the line is inserted into the slit 196 between the parallel slits 198a, 198b. The line guide serves to guide the line 104 within the reservoir 152 as it moves from the entry opening to the exit opening. Because the lid is made of a resilient material, the edges of the slit 196 rub against and seal the edges of the line guide to the top of the reservoir to prevent leakage of activator fluid.

The parallel slits 198a, 198b provide relief to and permit the edges of the slit 196 to spread to receive the line guide only along the part of the top where the line guide is located, without distorting the shape and dimensions of the entry and exit openings 160, 162. Additional parallel slits can be added between the parallel slits 198a, 198b and the openings 160, 162 to reduce any interference that spreading of the slit opening between the parallel slits 198a, 198b might cause to the entry or exit openings 160, 162.

Before use, as shown in FIG. 2A, the lid 164 is sealed by a peelable foil sheet 168 so that the fluid within the reservoir 152 does not leak through the openings 160, 162. In preparing the cartridge for use, the foil sheet is peeled off by pulling a foil tab 168.

In some examples, the bobbin is preloaded on the cartridge for delivery to the installer. A sliding bolt 157 (FIG. 2A) that is mounted on the inner ring 156 of the bobbin is engaged in a hole 159 in the outer ring 158 to prevent the bobbin from rotating accidentally and unwinding the line 104 until it is ready for use. In preparing the cartridge for use, the installer retracts the bolt from the hole to allow the bobbin to turn freely, which releases the line for threading through the cartridge and later use.

For use, the line 104 is threaded through the entrance and exit openings 160, 162 and along the line guide through the reservoir and then through the wheels of the applicator structure.

As shown in FIG. 2A, the line guide is held in the reservoir during storage and shipment and the foil sheet 166 has an opening to accommodate a handle 171 of the line guide.

Figure 2E:
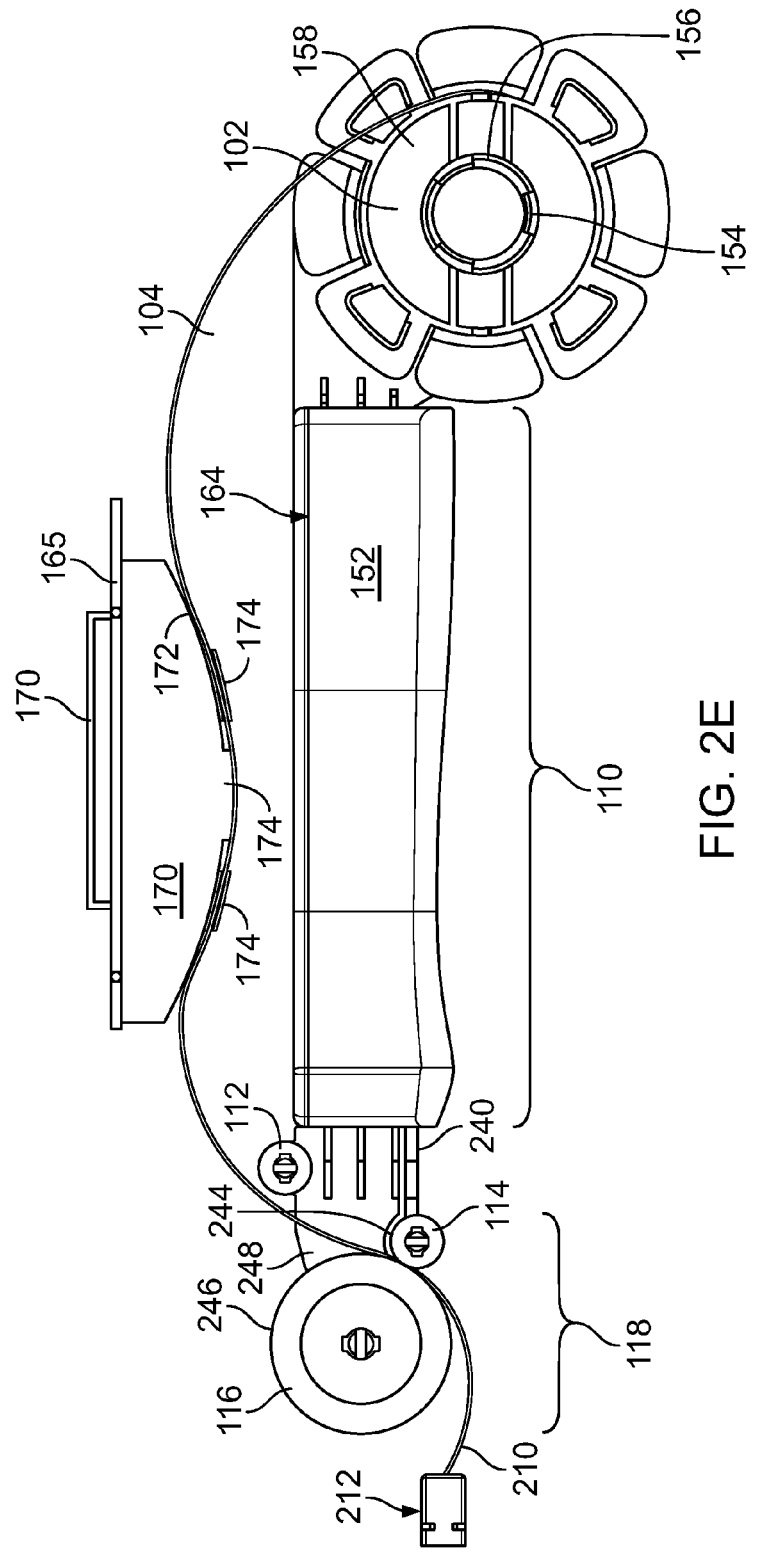
FIG. 2E is a side view of the cartridge, the line guide, and the bobbin.

Referring to FIGS. 2D and 2E, the line guide 165 can be lifted from the reservoir 152 by, e.g., pulling the handle 171, for threading the line 104. The line guide 165 includes a fan-shaped guide 170 arranged to extend vertically down into the reservoir 152. The line 104 to be threaded between the entry opening 160 and the exit opening 162 can be guided along a curved surface 172 of the guide 170. The curved surface 172 can include a groove or track in which the line 104 rests. In some implementations, the edges of the guide 170 include extended hooks 174 to guide the line 104 to follow the curve of the curved surface 172.

The curved surface 172 extends to a depth D of, for example, 88.5% or in the range of 80%, to 95% of a depth of the reservoir 152. Because the curved surface nearly reaches the bottom of the reservoir when the line guide is installed, the line will touch the activator fluid as long as there is even a small amount of fluid remaining. When there is so little fluid remaining in the reservoir 152 that the line will no longer contact the fluid, the cartridge can be replaced or refilled.

The curved surface 172 does not extend to the inner surface 178 of the lid 164. Instead, a clearance space 176 near the exit opening 162 allows the line 104 coated with the activator to exit the reservoir 152 without physical contact that would otherwise partially remove the activator or tacky material from the line 104.

To thread the line, the installer releases the bobbin to rotate, then pulls a length of line from the bobbin that is long enough to reach the applicator wheel. The line is threaded onto the curved surface of the line guide, then wrapped around the support wheel and placed between the retainer wheel 114 and the applicator wheel. With the foil sheet removed from the lid, the line guide is then pressed down into the reservoir and seated securely on the lid. The installer can then pull a length of the line through the reservoir to coat it and make it tacky and then begin to attach the line to the target surface.

Figure 2F:
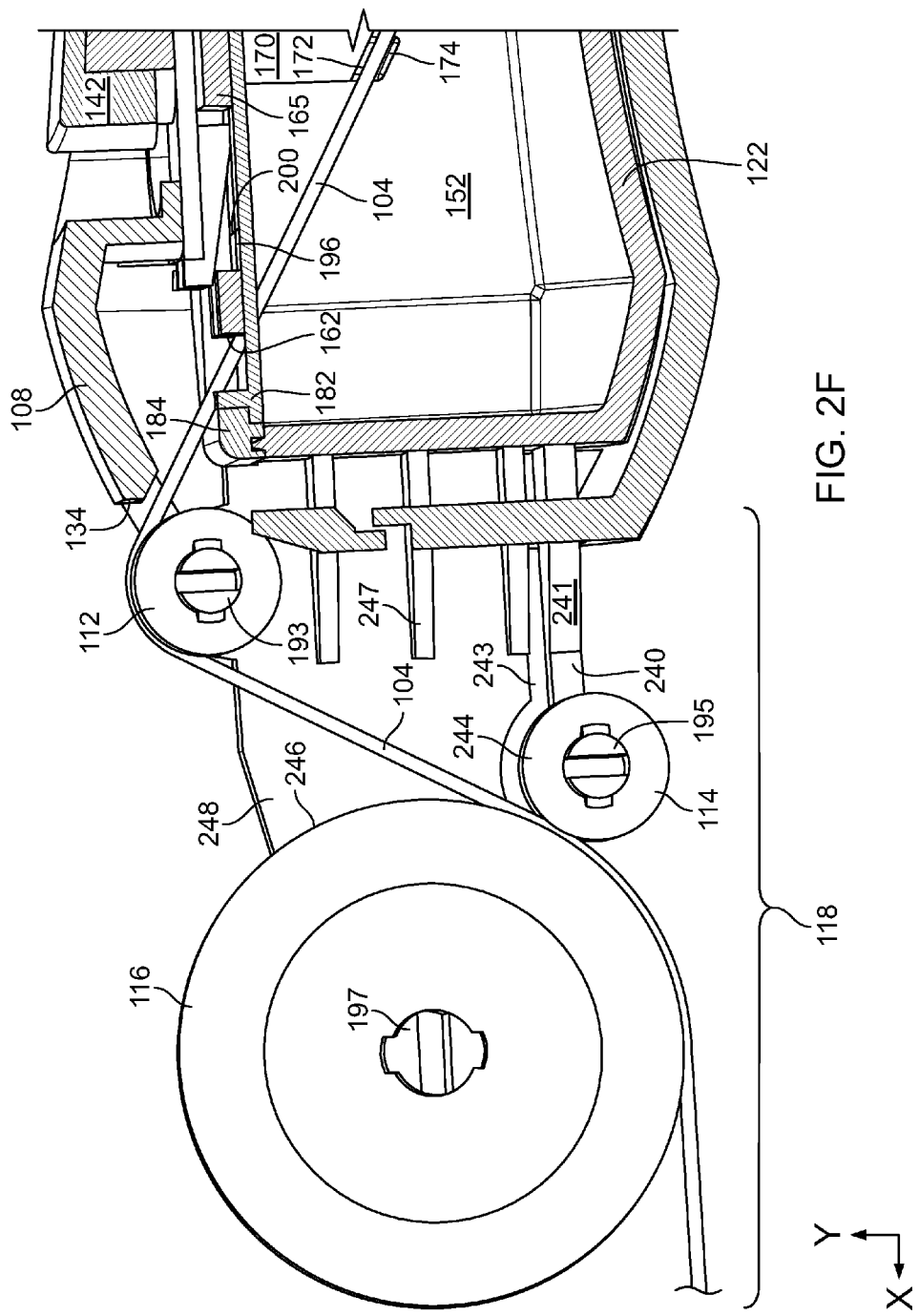
FIGS. 2F and 2I are cross-sectional views of a portion of the hand-held tools.

Referring also to FIG. 2F, during manufacture, each of the support wheel, the retainer wheel, and the applicator wheel is snapped onto spindles 193, 195, 197 that are molded into the body of the cartridge and are free to turn on the spindles.

The spindle for the retainer wheel 116 is attached to the cartridge 122 by a resilient flexure 240. The flexure includes an arm 241 that is separated from the main body of the cartridge by a clearance slot 243 that allows the flexure to move into and out of the plane of FIG. 2F. The retainer wheel 114 and the applicator wheel have peripheral grooves that are suitable for the diameter of the line, and leave a small clearance space between an outer peripheral surface 244 of the retainer wheel and an outer peripheral surface 246 of the driving wheel 116. Once the line has been threaded, the line is captured in the grooves and between the two wheels to keep it in place while the line is being laid out on the target surface.

To thread the line 104 between the grooves of the two wheels, the installer can push the wheel 114 into or out of the plane of FIG. 2F which makes threading the line between the two wheels simple and easy. Then the flexure is released. Three parallel buttresses 247 strengthen and support the applicator structure.

The three wheels can be made of polyoxymethylene (Delrin®) with low friction surfaces so that the line 104 does not lose a substantial amount of tacky material on the surfaces of the wheels and that the wheels do not become fouled by the tacky material. Other materials may also be used. The low friction surface is especially useful on the applicator wheel.

As shown in FIG. 2E, in some implementations, an electrical or optical connector or coupler 212 can be pre-attached at the original free end of the line, or can be attached there by the installer once the threading of the tool is done. A second coupler can be attached to the other end of the line where the winding of the line onto the bobbin was begun.

Thus, in some implementations, the bobbin is delivered with connectors on both ends of the line, ready to plug into the communication network on one end of the line, and into, for example, a modem on the other end of the line, for use by a computer or HDTV. Once the line has been laid out, any excess line on the final end is taken out of the tool on the bobbin and snapped into a module (plastic box on the wall near, for example, the modem.)

In some examples, only the end of the line on the bobbin (not the free end) has a connector. The free end (that is, the lead end has no connector) is spliced into the network (for example, at the entrance to an apartment, in the hallway, or just inside the apartment.

Figure 2G:
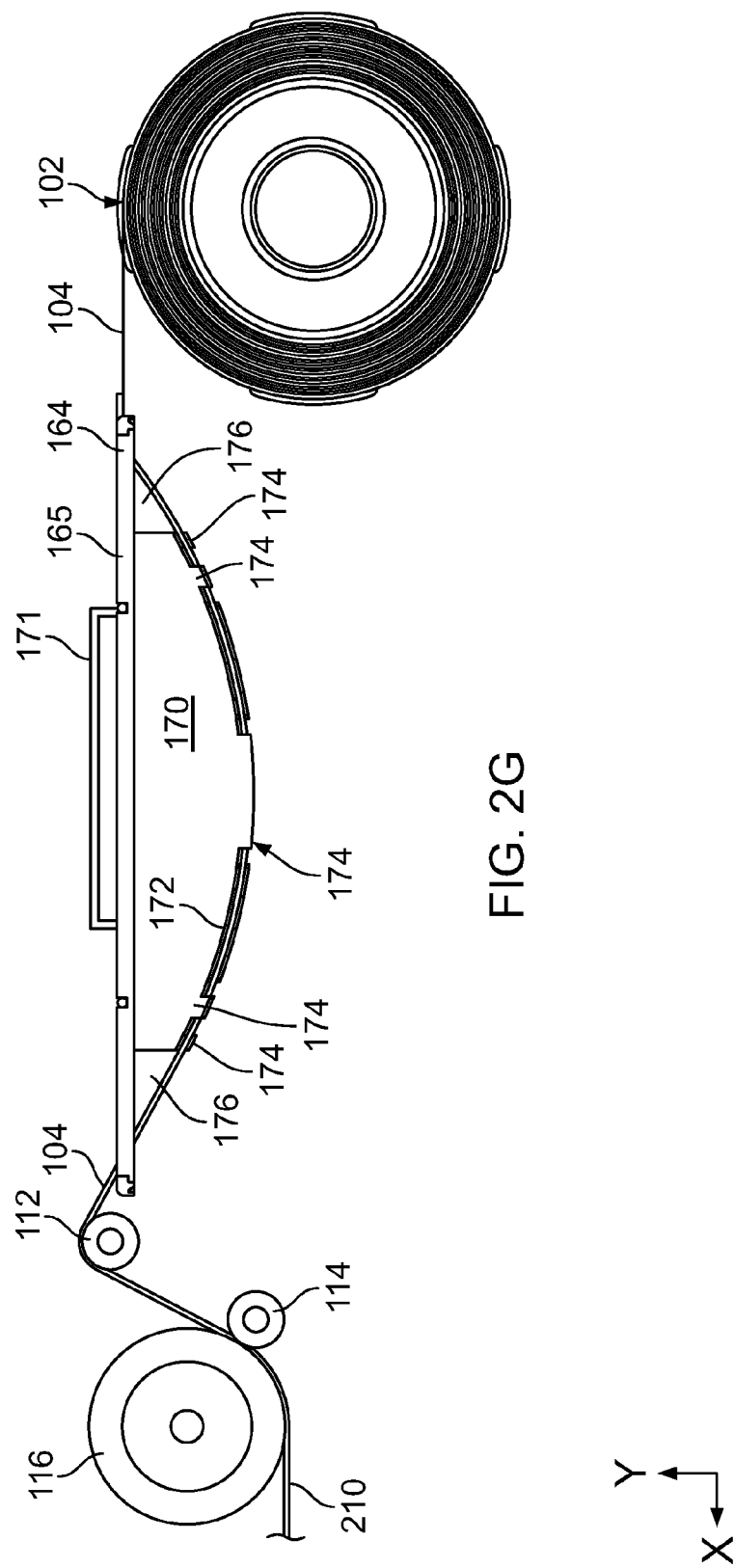
FIG. 2G is a side view of the line delivery path.

The entire line delivery path from the bobbin 102 to the drive wheel 116 is shown in FIG. 2G (only selected portions of the tool are shown).

Figure 2H:
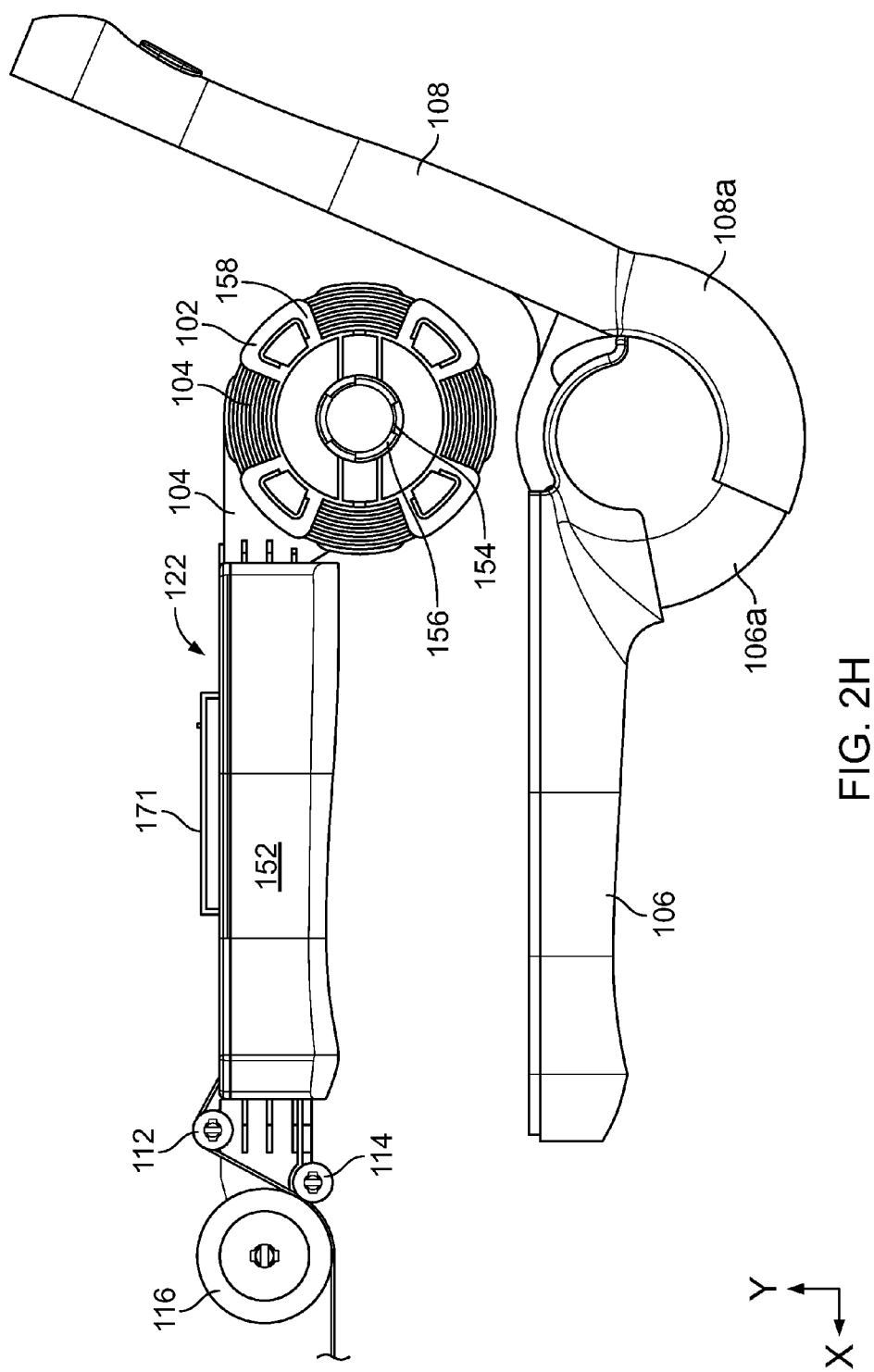
FIG. 2H is a side view of a hand-held tool.

Referring to FIG. 2H, once the threading has been completed, the shells 106, 108 can be closed around the prepared and threaded cartridge 122 and the bobbin 102 to form the hand-held tool 100 as shown in FIG. 1A.

The delivery path of the line 104 from the bobbin to the applicator wheel is designed to reduce, e.g., prevent, damage to the line 104 and to control the amount of tacky material carried by the line 104 to the target surface.

Referring again to FIGS. 2C and 2D, the entry opening 160 and the exit opening 162 each has angled walls 160*a*, 160*b*, 162*a*, 162*b*. In some implementations, none of the walls of the openings 160, 162 contacts the line 104 when the line 104 is delivered into and withdrawn from the reservoir. In particular, the size of the entry opening 160 and the slope of the angled walls 160*a*, 160*b* can be selected based on the line delivery directions 260*a*, 260*b* determined by the physical features, e.g., dimensions and relative locations, of the curved surface 172 and the lid wall 182. In an example, the diameter of the entry opening in the gasket is 0.055 inches at the angle of approach. The angled walls 160*a*, 160*b* can have the same slope or different slopes. The line 104 is delivered through the opening 160 without scraping along the walls 160*a*, 160*b*.

Figure 2I:
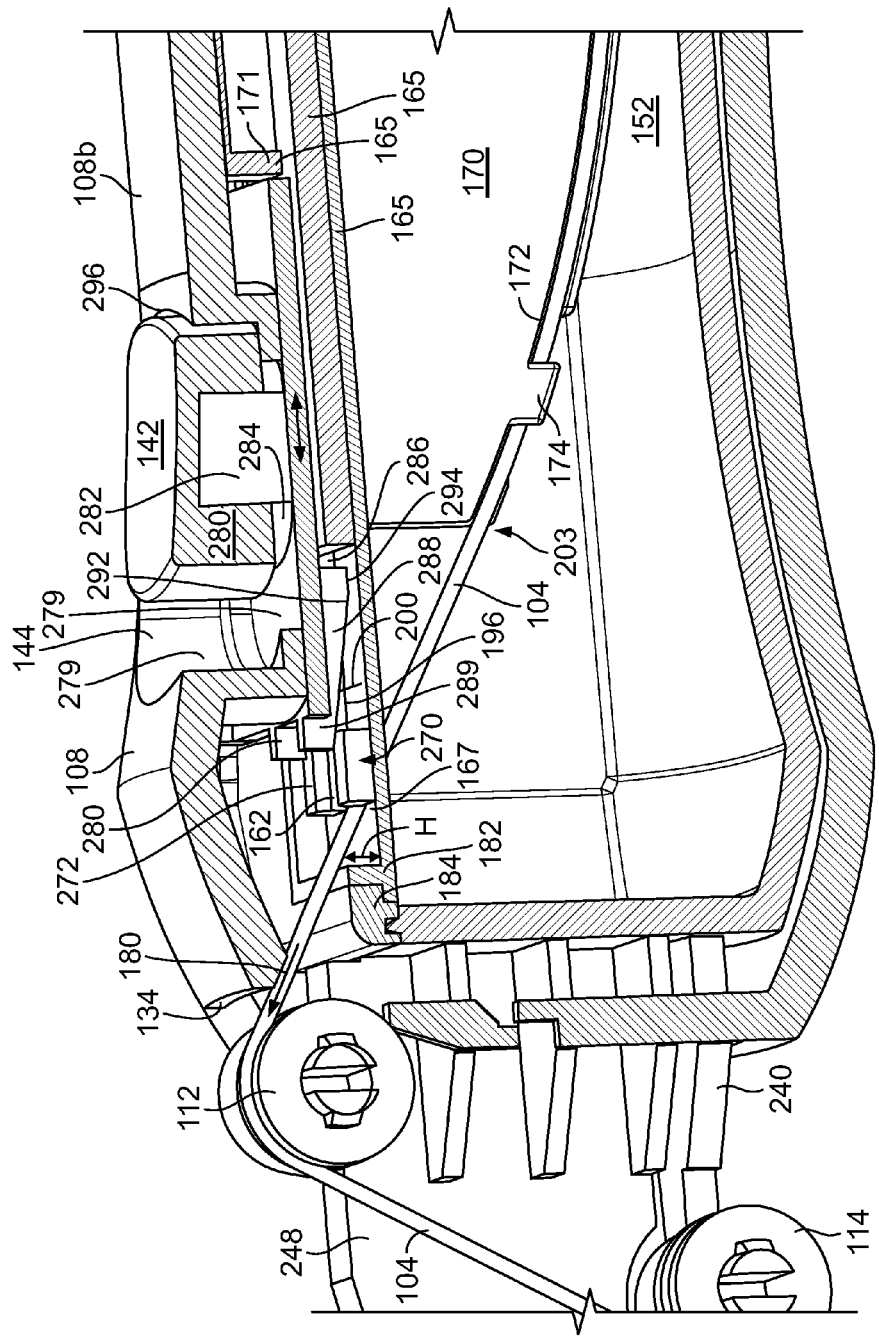

Similarly, referring also to FIG. 2I, the slopes of the exit opening walls 162*a*, 162*b*, and the locations and orientations of the lid 164, the upper shell 108, and the support wheel 112 are arranged so that the line 104 does not contact any of those elements before reaching the support wheel 112.

During use, the line is pulled along a straight path 180 between the end 203 of the line guide and the peripheral groove on the support wheel. Thus, the line delivery direction 180 at the exit opening 162 is determined by the relative locations of the guide wheel 112 and the curved surface 172. Other features along the exit path of the line 104, e.g., the height H of the lid wall 182, the thickness of the reservoir seal 184, the dimensions of the exit opening 162, and the recessed portion 134 of the upper shell 108, are designed based on the exit direction 180 such that none of the features contact the line 104 as the line is extracted along the direction 180. In an example, the diameter of the exit opening in the gasket is 0.055 diameter at the angle of departure from the reservoir, assuming that the opening has been set to its minimal size by the user.

At least some of the tacky material that is formed on and carried by the line 104 as and after it passes through the exit opening 162 can be blocked from leaving the reservoir by walls 162*a*, 162*b* (or other edges) of the opening 162. The size of the exit opening 162 is adjustable so that the amount of the activator and resulting tacky material that is able to be carried by the line 104 outside the reservoir can be adjusted. The wall 162a can be adjusted to increase the size of the opening 162.

Referring to FIGS. 2B-2C and 2I, the lid 164 includes an additional slit 200 between the slit 198b and the exit opening 162. The additional slit 200 has features similar to those of slits 198a, 198b, intersects the slit 196, and is parallel to the slits 198a, 198b. Because of the intersecting slit 200, the slit portion 274 of the slit 196 between the slit 200 and the opening 162 is free to open and close to increase or decrease the size of the opening 162 when the installer manipulates the control button 142 in the upper shell 108.

The control button 142 includes a button 280 exposed in the recessed space 144 formed by a wall 279 of the upper shell 108. The button 280 is connected to a movable ramp 288 underneath the upper shell 108 by connectors 282 and 286 that extend through an opening 284 in the upper shell 108. The movable ramp 288 has a parallel pair of angled bottom surfaces 292 that angle down along a direction away from the opening 162. The highest surface portion of the angled bottom surfaces 292 includes two protruding elements 289, 290 each resting on the top of ramps 270, 272 that protrude from the surface 167 of the lid 164. The bottom part 294 of the angled bottom surfaces extends above the surface 167 without penetrating the slit 196 to force the slit 196 to open.

When the button 280 is moved to the rearmost end 296 of the space 144 away from the opening 262, the protruding pieces 289, 290 rest on the ramps 270, 272 without deforming the ramps or the portions of the slit associated with the ramps. The opening 162 maintains its original size and shape.

When the user wants more fluid to be released from the reservoir, for example, to improve adhesion of the line 104 to a target surface, the user moves the button 280 forward from the end 296 towards the opening 162. The slope of the tilted surface 292 is selected so that the surface slides over the ramps 270, 272 to apply forces from the protruding elements 289, 290 to the ramps 270, 272 to push the ramps 270, 272 and deform the lid 164. The slit near the ramps and connected to the opening 162 opens and the opening 162 is enlarged. The changes in the size of the opening 162 do not substantially spread into slit portions of the slit 196 beyond the slit 198b. The size of the exit opening 162 increases and the amount of activator fluid or tacky material carried by the line 104 and exiting the enlarged exit opening 162 increases.

When the user finds that too much tacky fluid is attached to the line 104, the user can move the button 280 away from the opening 162 towards the end 296 to reduce the size of the exit opening 162. In some implementations, the button can be arranged with detents to provide for a discrete number of settings (for example, normal, more, less).

The tool has a size to make it easy to hold and use in attaching the line to the target surface. The portion of the tool that contains the reservoir can be of a cross-sectional size and length to make it easy to hold in the installer's hand.

In some implementations, the outer surface of the line is made tacky by pre-processing the outer surface with a re-wettable adhesive film that can be dried and later activated (re-wetted) by an activator fluid, for example, located in the reservoir of the tool.

In some cases, the adhesive film or coating can be formed using a water-based adhesive, and the activator can be a water-based adhesive activator solution. The adhesive component can be designed to be used to pre-coat, for example, an outer buffer layer of a 900-micron optical fiber. When activated, the adhesive enables the buffered optical fiber to be attached to a variety of surfaces commonly encountered, for example, in residential living units.

In some examples, the adhesive contains boric acid, a common ingredient in adhesives. Boric acid is soluble in boiling water, but not readily soluble in cold or warm water. Boric acid helps the adhesive system to resist humidity in the ambient air of the target surface after the line is attached. Boric acid also enhances the resistance of the installed line to cleaning fluids, and serves as a flame retardant, an insecticide, and an inhibitor of mildew, mold, and algae.

The proportion of the activator that is made up of boric acid may be, for example, about two percent, although the amount could be more or less than two percent. The activator also can contain tackifiers and may or may not contain some adhesive, including, for example, the same or a similar adhesive to the one that is pre-coated on the fiber in small amounts to ensure compatibility of the two parts. The tackifiers can be resins.

A variety of activating components, and combinations of them, could be included in the activator, such as ammonia, isopropyl alcohol, and acetone.

Additional humidity resistance and resistance to household cleaners can be attained by adding small amounts of acrylic polymers to the adhesive or the activator or both. Adding such components tends to make the adhesive system more similar to acrylic house paint technology.

After the optical fiber is pre-coated with the water-based adhesive, the surface is allowed to dry. The dried adhesive is free of tackiness which allows the fiber to be spooled and packaged with a desiccant for storage, delivery, and later use. Additional ingredients such as calcium carbonate or corn starch can be used, e.g., as a dusting agent, during drying to further prevent tackiness during storage of the pre-coated optical fiber.

During installation, the fiber is un-spooled and passed through an activation chamber or reservoir containing the adhesive activator solution. The adhesive layer, which is in that way re-activated, becomes temporarily tacky, allowing for the fiber to be adhered to surfaces quickly and without any excessive force or dwell time. Upon evaporation of the activator solution, the adhesive forms a lasting bond to the surface, holding the fiber in place. Once dry, the adhered fiber surface is again tack free and therefore will not collect dust or dirt.

In some examples, the re-wettable adhesive can be a water-based adhesive that has the following properties. Brookfield viscosity in the range of about 7,000-10,000 cps at 25.degree. C.; total solids in the range of 39-42%; weight per gallon in the range of 8.6-9.2 pounds; appearance is a milky white dispersion.

In some implementations, the activator solution includes one or more plasticizers, water, one or more tackifiers, additional adhesives, or a combination of one or more of them. When in contact with the activation solution, the dried adhesive layer on the fiber can physically absorb moisture to regain its tackiness. In some implementations, the adhesive layer chemically reacts with components of the activator solution to make the adhesive layer tacky, e.g., tackier than the adhesive layer before drying when it is temporarily tacky. The chemical reaction may include polymeric cross-linking, partially or fully, and can be cured after the fiber is applied to a target surface, e.g., a wall.

In some implementations, typical properties of the activator include a Brookfield viscosity in the range of 3,000-5,000 cps at 25.degree. C.; total solids (by weight) in the range of 21-25%; weight per gallon in the range of 8.5-9.1 pounds; color and appearance—translucent to slightly turbid.

Adhesives and activators suitable for attaching buffered optical fiber to interior building surfaces and for other applications are available from Worthen (Worthen Industries, 3 E Spit Brook Road, Nashua, N.H. 03060-5783, (603) 888-5443)). Specific formulas that may be used are available as part numbers WZ-0791 and, WZ-0792 from Worthen.

Part number WZ-0791 is a re-wettable adhesive composed of a water-based vinyl acetate-ethylene copolymer dispersion blended with either polyvinyl alcohol or polyvinylpyrrolidone, or both, and may also contain additives to modify the flexibility, blocking resistance, and water sensitivity of the dried adhesive. The adhesive may or may not be plasticized using propylene glycol, related glycol or glycol ethers or glycerin or other humectants. Re-wettable adhesives are also described in U.S. Pat. No. 7,235,608, U.S. Pat. No. 5,296,535, U.S. Pat. No. 3,988,495, U.S. Pat. No. 4,322,472, U.S. Pat. No. 4,575,525, and U.S. Pat. No. 4,639,395, the entire contents of which are incorporated by reference.

Part number WZ-0792 is an activator solution composed of a water-based polyvinyl alcohol solution that may or may not be reacted with boric acid and may contain additives to modify the flow, wetting, and adhesion on various surfaces as well as the resistance to common household cleaners. The activator may or may not be borated. The activator may be modified by the addition of acrylic polymers, wetting agents, or surfactants. The drying time of the adhesive system may be modified by adding isopropyl alcohol, acetone, or another solvent, or a combination of them.

The activator polymer in the reservoir is not soluble in cool or warm water, only in hot water. Therefore, during installation, when the fiber has been coated with the activator solution, which is tacky in the wet state, and it subsequently dries (e.g., polymerizes), the resulting dried adhesive is in the form of a protective film that is resistant to humidity and mild water exposure.

Testing of the dried adhesive has shown that water alone is not an effective activator for the adhesive, and once installed, the adhering qualities of the adhesive holding the fiber to the target surface are not adversely affected by elevated ambient humidity.

For common surfaces such as acrylic painted surfaces and untreated wood, the adhesion is excellent. For hard-to-adhere surfaces (oily or dirty surfaces, for example) a touch up adhesive or caulk can be provided to supplement the adhesive system.

Tests of such a system of adhesive and activator that has been used to attach a line to a surface has established that the attachment can withstand a seven-days heat cycling test from 14 degrees F. to 120 degrees F. and a seven-days heat and 95 percent humidity cycling test. This resistance to wide variations in temperature may result from the use, in the activator, of three or more component polymers having different Tg values (glass transition temperatures). In addition, the viscosity and gelling qualities of the activator may contribute to the temperature and humidity resistance. If a pressure is applied on the installed fiber, the adhesive coating may move or flow. The dried (cured) adhesive is relatively hard, non-tacky, and non-porous, enabling it to resist penetration of water. Cleaning with water may, nevertheless weaken the adhesive system.

We now describe, as an example, how an installer would prepare and use the cartridge and the tool to install optical fiber on interior target surfaces of an apartment.

In some implementations, the installer arrives at the location where the optical fiber is to be installed with a supply of loaded packaged plastic bobbins, a supply of packaged cartridges that contain activator (and may also contain loaded bobbins), and at least one clamshell tool in which one cartridge and one bobbin are to be mounted at a given time to install the fiber.

To prepare for installing the fiber, the installer mounts one of the bobbins on the mounting prongs of one of the cartridges (or in some cases, the bobbin is already mounted at the factory on the cartridge). She unlocks the bobbin bolt to permit the bobbin to rotate freely and pulls the free end of the fiber to release a length of the line from the bobbin. She peels open the top of the cartridge by pulling on the foil tab. After removing the line guide from the reservoir, she threads the fiber along the curved guide surface of the line guide, and around the support wheel. She then pulls the flexure holding the retainer wheel to move it aside, threads the fiber onto the applicator wheel and then releases the flexure to hold the fiber in place.

Next, she inserts the line guide into the reservoir along with the line, presses the two ends of the fiber through the entrance and exit openings to seat them and pulls on the free end of the fiber to remove any slack. She then inserts the cartridge into the bottom shell of the tool, closes the top shell down onto the bottom shell and is ready to install the fiber.

To attach a length of the fiber to the target surface, the installer pulls a short length of fiber from the applicator wheel of the tool to activate (make tacky) the outer surface of the fiber and bring the tacky fiber into position at the applicator wheel. She then pushes the applicator wheel against the target surface at a point where it is to be attached, with the fiber between the wheel and the target surface. The tacky material on the outer surface of the fiber sticks to the target surface. If the fiber does not stick tightly enough to provide tension against the pulling of the tool away from the attachment point, the installer might press her finger at the attachment point to provide the needed tension temporarily.

Once the free end is secure on the target surface, the installer begins to pull the tool away from the attachment point slowly and evenly while continuing to press the applicator wheel against the target surface along the intended path. As a result, the applicator wheel rolls along the target surface, the fiber is placed on the target surface from the applicator wheel, and the tacky material on the outer surface of the fiber holds it in place along a desired path on the target surface.

If the fiber becomes attached along the wrong path or if there is another problem with the attachment, the installer can easily slide the fiber into the correct position, and can do this more than once. Or the installer can peel up the fiber and re-attach it, or peel up the fiber and discard the incorrectly attached piece.

The installation can proceed with a single long fiber along a contorted path over many different target surfaces, one after another, until the job is done. When one length of fiber has been installed, the bobbin and any remaining fiber is bundled at the end of the attached fiber and placed in the module where the end of the fiber is to be electronically coupled. If the fiber on the bobbin is not long enough to finish the job, a coupling module is used to couple the final end of the fiber to a fresh end of a new length of fiber that has been threaded on the tool. If the line is not long enough to complete the job, when the line on the bobbin reaches its end, the installer can place the coupler that is provided at the end of the line into a junction box that would be mounted on or near the target surface. The installer then plugs a coupler attached to the free end of a fresh bobbin into the coupler in the junction box and continues the installation, and so on.

For convenience, bobbins can be loaded and distributed with different lengths of fiber for use in different kinds of jobs.

Within a short time, say 30 minutes or 60 minutes (or more or less than those times in some applications) after a length of fiber has been attached, the tacky material will be dry and will then hold the fiber in place for years, unless removed by peeling it away from the target surface or by applying a release agent (for example, water) to cause the dried material to release the fiber.

As the work progresses during a job, either the bobbin may run out of fiber or the chamber in the cartridge may run out of activator fluid or both. In the former case, the installer discards or recycles the empty bobbin and puts a fresh one on the spindle. In the latter case, the installer disconnects the fiber from the cartridge, removes the bobbin from the spindle, opens and re-threads a new cartridge, and re-starts the installation process.

Once the fiber is installed, communication connections can be made to the ends of the fiber in the usual way.

A wand 68 can be attached to the tool to increase the installer's reach. The wand can be arranged to extend or contract as needed.

In some cases, during installation, the installer may wish to lay out a length of the fiber along the target surface temporarily in a dry state prior to activating the adhesive. As noted earlier, to do this, the installer can temporarily remove the bobbin from the tool (but without unthreading the fiber from the reservoir or the applicator structure), pull dry fiber off the bobbin and lay that section along the target surface in the reverse direction from the direction that would occur if the fiber is laid out from the applicator structure.

Once the section is temporarily in position along the desired path, the clamshell can be closed (if it hasn't already been) with the fiber from the external bobbin running through the slot at the back of the tool and through the reservoir to activate the pre-laid fiber. Eventually the tool reaches the bobbin, and the installer then opens the clamshell and reinstalls the bobbin. Then the tool is ready to be used again in the normal direction.

During installation, the installer may wish to alter the volume per unit length of tacky material that is delivered with the fiber to the target surface. The activation of the adhesive on the outer surface of the fiber begins when the activator first contacts the fiber within the chamber and continues after the fiber exits the chamber and is applied to the target surface. The volume of tacky material that is formed on the outer surface of the fiber will depend on the volume per unit length of adhesive that was applied during the pre-processing of the fiber and on the volume per unit length of activator that is on the fiber when the fiber exits the chamber, among other things. Therefore, by controlling the volume per unit length of activator that is on the fiber when it exits the chamber, the installer can control the volume per unit length of tacky material that is available for adhering the fiber to the target surface.

During installation, the installer can observe whether the volume of tacky material that is available to hold the fiber on the target surface is about right, too much, or too little. By manipulating the button on the tool, the installer can select any of three application rates or in some implementations a variable rate within a range. The button controls the size of the exit aperture so that more or less activator can slip through the opening with the fiber. Because the fiber passes through the center of the exit aperture rather than touching a peripheral edge of the aperture, the activator is not wiped away from any edge of the fiber as it exits but rather is relatively evenly distributed around the circumference of the fiber.

The installer can change the application rate frequently as needed, or leave it unchanged, if desired.

Figure 10:
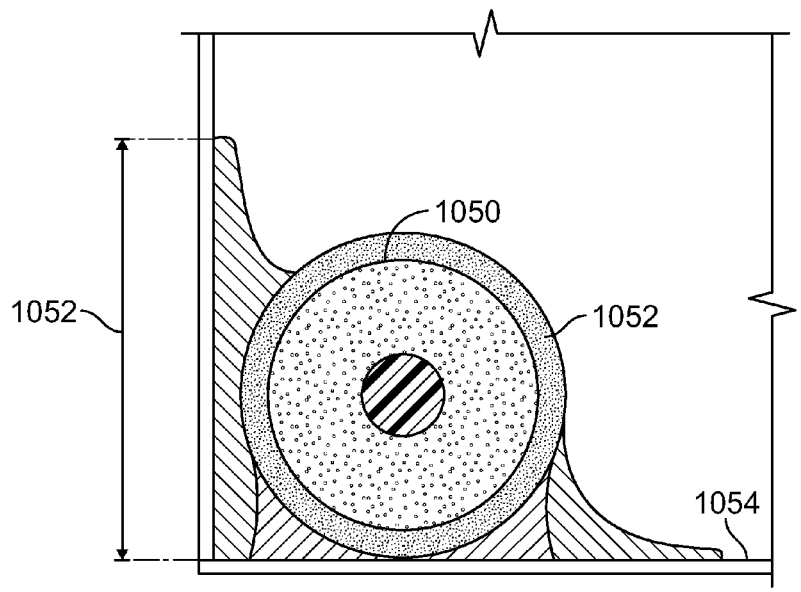
FIG. 10 is a cross-sectional view of an installed line.

As shown in FIG. 10, when the fiber 1050 is laid onto the target surface, the tacky material on the outer surface of the fiber 1052 comes into contact with the target surface 1050, surface tension in the tacky material will tend to cause some of it to flow towards and touch a broader portion 1052 of the target surface in the vicinity of the fiber. The result is that a continuous bead of tacky material is formed along the interface of the fiber and the target surface, and the bead encloses the fiber and a strip of the target surface along which the fiber lies.

When the bead is dried, the fiber is held securely in place. When the fiber is relatively small in diameter (smaller than 500 microns, or smaller than 1000 microns, or smaller than 2000 microns, say), the attached fiber is not noticeable and can be essentially invisible. This effect is even more pronounced when the fiber is installed in a corner (say where a baseboard meets a wall or a wall meets a ceiling). In such an installation, the bead formed by the tacky material can fill the corner and provide a very strong, protected bond of the fiber to the target surface.

The surface of the dried bead is dry and will not attract or retain dust or dirt, which could otherwise make the attached fiber much more visible and unattractive.

The fiber that is wound on each bobbin is optical fiber of any size, kind, cost, construction, length, or other characteristics. The fiber may be standard available fiber or fiber that is specially constructed for use in the system described here. In some examples, the fiber is a buffered 900 micron optical fiber with a 100 micron protective PVC jacket. In some examples, the fiber is a 250 micron bare, 900 micron tight buffered or cordage (900 micron with aramid yarn and outer jacket.) The final outside diameter of the buffered and jacketed fiber could be in the range of 940 to 1000 microns, in some examples.

When we refer to buffered fiber we mean to include broadly, for example, any fiber that is protected, "buffered" by an additional material to provide ease in handling. Fiber that is said to be tightly buffered can have the additional protection coated directly onto the fiber.

In some examples, the fiber includes a glass core, an acrylic coating, a second acrylic coating, a jacket of PVC or nylon or urethane, and the pre-coated adhesive discussed here.

Other fibers or lines can also be used. For example, lines for use on an exterior of a building or wall can be have a large thickness and can be wound on the bobbin and applied using the hand-held tool.

Figure 8:
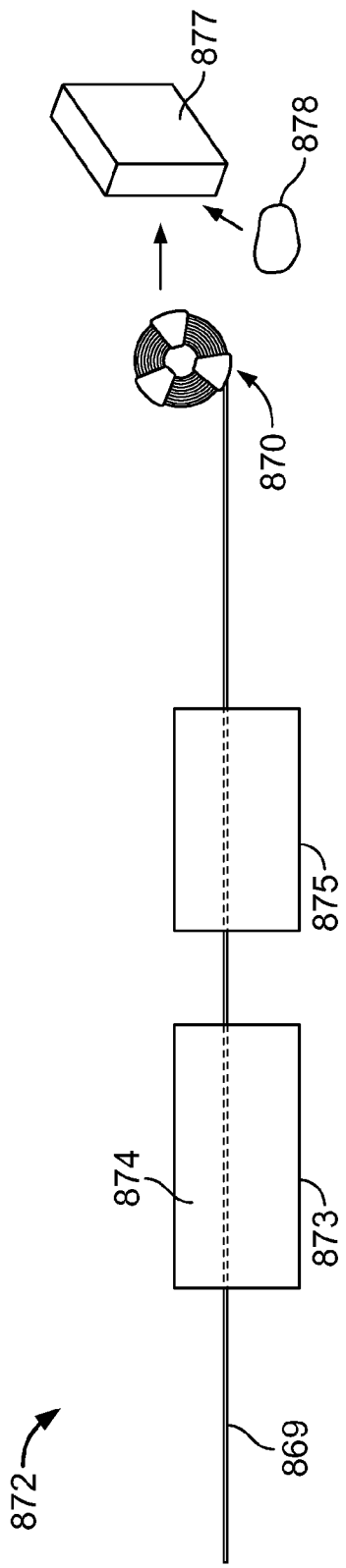
FIG. 8 is a schematic view of a bobbin fabrication process.

As shown in FIG. 8, to prepare the fiber 869 prior to being wound 870 on the bobbin, it is processed on a processing line 872 by applying 873 a coating 874 of adhesive in a fluid state and causing 875 the fluid to achieve a dry state. The coating can be applied in a wide variety of ways, including spraying, dipping, brushing, or rolling, to name a few. For certain materials used as jackets for the fiber, such as nylon or urethane, it may be useful to apply a primer coat before the adhesive is applied. The dry state can be achieved by air drying, heating, subjecting the adhesive to a chemical drying process, or in any of a wide variety of other possible ways. For example, the adhesive can be coated as a hot melt adhesive and dried by cooling. Sometimes UV curing can also be used. In some implantations, the coating, e.g., an adhesive layer, can be extruded onto the fiber. For example, the fiber can be passed through a die to receive the adhesive and subsequently be passed through an oven for drying.

The volume per length of fiber at which the adhesive is applied could be varied widely depending on, for example, the nature of the target surface to which the fiber is to be applied (coarse, smooth, absorbent, non-absorbent, vertical, horizontal, painted, to name a few) the ambient temperature and humidity at the installation location, the structure and surface characteristics of the fiber and its layers, and on a wide variety of other factors. The higher the volume of adhesive per length of fiber, the higher the volume per length of fiber that is available at the installation location to cause the fiber to adhere to the target surface.

After the fiber has been coated, dried, and wound onto the bobbin, the bobbin can be packaged in a sleeve or other container 877 together with a packet of a desiccant 878. In examples in which the adhesive layer is to be activated by a water-based activator, water in the atmosphere could unintentionally partially or completely activate the adhesive during delivery or storage of the bobbins; the desiccant can reduce that effect. In some implementations, sealing the bobbin in an airtight packet may be sufficient to prevent unintended activation of the adhesive during shipping and storage.

For delivery, sets of bobbins can be assembled and packaged together in bulk. In some implementations, each bobbin can be pre-mounted and packed individually with an associated cartridge in a single package. The amount of adhesive loaded into the chamber of the cartridge can be roughly matched to the length of fiber on the spindle for a typical installation, so that the cartridge and bobbin can be discarded or recycled at one time as soon as either the fiber or the adhesive runs out. In some such examples, the length of the fiber on a bobbin could be 25, 50, 75, 100, 125 or 150 feet. The volume of activator could be between about 60 ml and about 90 ml.

In some implementations, the cartridges (without bobbins) and bobbins are packaged and delivered separately and as many of each are used as needed without a one-to-one correspondence between bobbins and cartridges used. Each bobbin and cartridge could be discarded, refilled, or recycled when spent.

Figure 9:
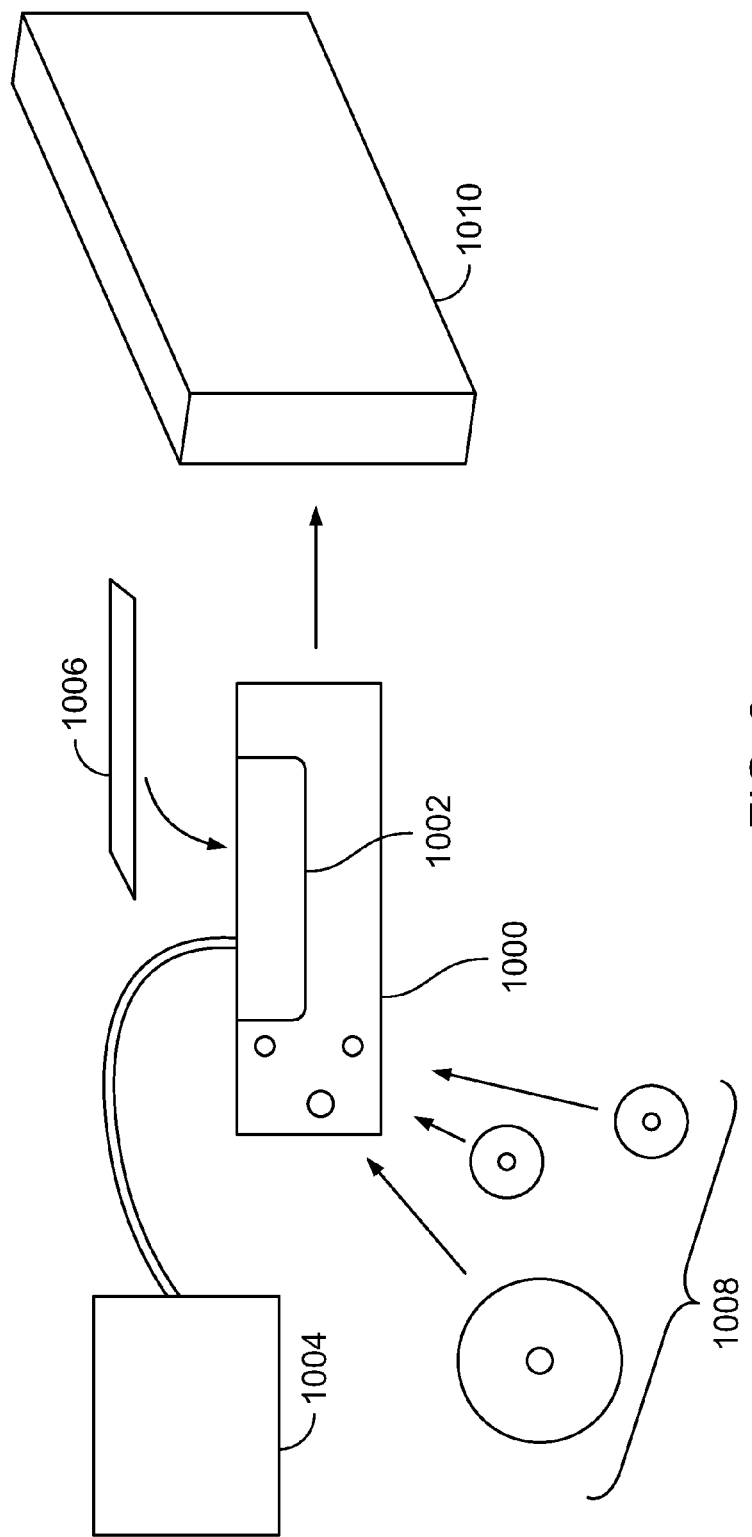
FIG. 9 is a schematic view of a cartridge fabrication process.

As shown in FIG. 9, in some implementations, each of the cartridges is assembled from a main molded plastic body 1000. The chamber 1002 of the cartridge is filled from a large supply 1004 of activator. A temporary foil seal 1006 is attached to the opening of the chamber to seal the chamber. The support wheel, the retainer wheel, and the applicator wheel 1008 are pressed onto spindles included in the molded plastic body. The cartridge is then packaged ready for delivery and use in the field.

Although we have described certain examples above, our concepts encompass a very broad range of implementations.

For example, although what we described as being installed is optical fiber, these concepts can be used to attach any kind of fiber or wire or cable or other communication line or any other kind of line (including non-communication lines such as thread or cord or strands), of any size, shape, use, configuration, or characteristics to a target surface.

The fiber, communication line, or other line that is being attached to the target surface need not be a single line, but could be a combination of two or more identical lines, or two or more non-identical lines, and the lines may be bundled, taped, aggregated, or sheathed in a wide variety of ways including as flat multiple-line cables.

The line or lines need not be sheathed or jacketed or bundled or protected, but could be attached in their raw state, for example as a raw optical fiber or fibers or a plain wire or wires.

The tool or cartridge need not include a supply of fiber. Instead the fiber could be delivered to the tool from a separate bobbin or other supply external to the tool, and the supply could be very large. The supply of fiber need not be wound.

The cartridge could be refillable with activator at the installation site from a larger refill container. The refill container and the cartridge could be configured to mate in a special way to assure that only approved or known activator is reloaded into the cartridge.

Although we have described examples in which the fiber is pre-processed with adhesive that can be made tacky using an activator at the site of the target surface, there are a very broad range of approaches to making the fiber temporarily tacky for attaching the fiber, which may or may not involve pre-processing the fiber. Some other examples include adhesives that remain tacky after the preprocessing and are wrapped temporarily with a release layer that is removed at the installation site. In some examples, the fiber need not be pre-processed. Instead a tacky adhesive could be applied at the installation site and then cured or dried after the fiber is attached.

In some implementations, the fiber can be pre-coated with a material, e.g., polyurethane elastomer, which chemically reacts, e.g., cross-links upon heating, with one or more components of the activation solution to provide surface tackiness to the fiber. The activation solution can include water, one or more adhesives, one or more plasticizers, one or more tackifiers, or the combinations thereof.

One or more, e.g., all, of the multiple layers can be transformed to be tacky when the layers contact the activation solution. In some implementations, some of the multiple layers are activated through physical reactions, e.g., moisture absorption, and some of the multiple layers are activated through chemical reactions, e.g., cross-linking. The layers and the mechanisms of transformation can be chosen based on the level of tackiness needed, the thickness of the fiber, the surface features of the substrate onto which the fiber is to be applied, and others. Examples of cross-linking is described in U.S. Pat. Nos. 5,580,946 and 5,516,857, the entire content of which are incorporated herein by reference.

Other uses can include applications in exterior regions of a building. For example, the fiber can be bonded to a concrete wall or stucco walls at a mall or military installation. The installation of the fibers or lines may need enhanced performance compared to the installation in interior regions. For example, the installation may be exposed to weather conditions and may need to secure the fibers or lines to the exterior regions. To achieve the high-performance installation, the curing mechanism can be separated from the adhesive on the fibers or lines until installation of the fibers or lines is required. The line could be pre-coated with an adhesive that contains active epoxy groups at any number of percentages that will react with an activator that contains an appropriate level of a curing agent, e.g., an amine curing agent. When the line runs through the activation chamber the adhesive on the fibers and the curing agent contained in the activator come in contact and react chemically. The product of the chemical reaction provides tackiness to the surface of the fibers or lines with an enhanced performance for the use in the exterior application. The curing and/or chemical reaction can involve the urethane technology or the UV curing technology. The resulting fiber or line can be fully encased by the tacky product. In some implementations, line can be installed on equipment such as reactors or bulk storage tanks.

The coating, containing an adhesive, of the preprocessed fiber can also be made tacky using heating, radiation by light, or mechanical mixing. For example, the cartridge can include a heating source or a light source to activate the fiber coating.

Curing or drying of the tacky material after attachment of the fiber can be done in a wide variety of ways, including by heating, irradiation, RF energy, chemically, and in other ways.

The layer, e.g., adhesive layer, on the pre-processed fiber and the activator contained in the hand-held tool act together to provide a desired tackiness to the fiber surface, e.g., encase the entire fiber surface with tackiness. The materials selected for use as the adhesive layer or to be included in the activators can be the same or can be different, depending on the need of the fiber. For example, drying time, thickness of the tacky layer, strength of the attachment of the fiber to the target surface, and other elements can be taken into account in selecting the materials.

In some implementations, the adhesive and a corresponding activator are chosen to balance the multiple needs of the fibers and lines, for example, the need to achieve a desired initial grab of the adhesive onto the surface of the fibers and lines, a desired initial grab of the fibers or lines onto the target surface, the robustness of the adhesive bond to the target surface, the environmental safety, and/or the need for forming the adhesive coating on the fibers or lines.

In some implementations, suitable materials can include solvent based materials, hot-melt materials, or emulsion materials. One or more adhesive materials and one or more activator materials can be formulated as corresponding to each other, so that when used together, the combination of the selected materials produce a desired tackiness (and other features) to the fiber. For example, when enhanced performance of the tacky fiber surface is needed, e.g., when the fiber is applied to an exterior of a building, urethane and epoxy can be selected as the adhesive and activator materials. As the fiber passes the hand-held device, the combined effect from urethane and epoxy allows the fiber to be applied to the target surface with strong bonding.

In some implementations, the adhesive contains one or more polymers, plasticizers, tackifiers, additives for UV protection, fire resistance, desired dry times, or other additives for desired properties. The percentages of each component in the adhesive can vary depending on the particular type of polymers and/or requirements for pre-processing the fiber with the adhesive.

The amount of adhesive to be pre-applied to the fiber, and the amount of various components in the adhesive can vary based on different needs. For example, when the adhesive includes solvent based materials including acetone and/or isopropyl alcohol, the concentration of acetone and/or isopropyl alcohol can be varied to adjust dry times. The components can also be adjusted to improve adhesion to various target surfaces or substrates. The concentrations of different solvents can vary and in some instances, selection of two or more solvents are made based on their combined effects. In some implementations, the components of the adhesive are chosen such that the adhesive is environmentally friendly. For example, volatile organic compounds are avoided or used in a low amount or a low concentration. Examples of suitable solvents for use in the adhesive includes oxygenated solvents, such as alcohols, glycol ethers, ketones, esters, and glycol ether esters; hydrocarbon solvents, such as aliphatic and aromatic hydrocarbons; or halogenated solvents, such as chlorinated hydrocarbons.

When hot-melt adhesives or pressure-sensitive hot-melt adhesives are used, tackifiers can be added to improve the adhesive's grip strength to the surface of the fibers or lines and the initial tack provided by the adhesive on the fibers or lines before drying. Suitable tackifiers include natural-based materials, such as resin esters, or petroleum-based materials, such as C-5 resins. As an example, a pressure-sensitive hot-melt adhesive to be applied to the surface of the fibers/lines can include SIS Kraton 107 rubber at 32.8 wt %; a tackifier resin, such as Wingtack 95, at 32.8 wt %; a plasticizing oil, such as Shellflex 371, at 13.1 wt %; an endblock resin, such as Cumar LX-509, at 19.7 wt %; and a zinc stabilizer at 1.6 wt %. Other polymers suitable for use in hot-melt adhesives include low-density polyethylene, polyamides, ethylene acrylic copolymers, atactic polypropylene, phenoxy resins, polyesters, polyesteramides, polyurethanes, butyl rubbers, polyvinyl acetate, copolymers, and paraffin waxes.

The adhesive can also include one or more plasticizers as a component. The plasticizers can balance the adhesive properties to meet the application needs. The plasticizers are generally low molecular weight materials with low Tg. The plasticizers can improve wetting of the pre-processed fiber surface and improve adhesion of the fiber or line to a target surface. The plasticizers can also improve flow of the adhesive and increase filler loadings between the target surface and the fibers or lines. The overall cost of attaching the fibers or lines can be reduced, e.g., by using less adhesive or activators. Without being bound by the theory, it is believed that the plasticizers can lower the glass transition temperature (Tg) of adhesives or sealants formulation to improve tack (pressure sensitive nature), peel, impact resistance, and low temperature performance of the adhesive. In addition, based on their low molecular weight and viscosity, plasticizers can also be used to improve the processability of the adhesive, e.g., in forming the adhesive coating onto the fibers or lines. When used with other selected components of the adhesive, the selected types and amounts of plasticizers can change the following features of the adhesive: reducing modulus, tensile strength, hardness, density, melt viscosity, glass transition temperature, electrostatic chargeability, and/or volume resistivity; and/or increasing flexibility, elongation at break, toughness, dielectric constant and power factor, softness, impact resistance, and/or low temperature.

Suitable plasticizers for use in adhesives can include Hexamoll® DINCH from BASF (Ludwigshafen am Rhein, Germany), which is a non-phthalate plasticizer and which can be added to adhesives in order to increase wetting and improve low temperature performance; Vanplast PL, which is an elastomer plasticizer, or Vanplast R, which is clear elastomer plasticizer from R.T. Vanderbuilt Company, Inc. (Norwalk, Conn.). Other suitable classes of plasticizers include phthalates (ortho, iso and tere), Abietates (terpenes), Adipates, Benzoates, Citrates, Epoxy, Glutarates, Glycol esters, Hydrocarbons, Hexahydrophthalates, Chlorinated paraffin, N and Isobutyrate, Pentaerytheritol esters, Phosphates, Polyesters, Ricinoleates, Sebacates, Sulphonamides, Sulfonates, Trimellitates, Soy and other oil derivatives, and/or Ethers.

The amount of the plasticizer can vary within a certain range based on desired properties and effectiveness of the plasticizer in a specific formulation for the adhesive. Different types of plasticizers can be used in combination in one adhesive. In an example, the adhesive contains 1% plasticizer. Increasing the plasticizer percentage can increase the water sensitivity of the adhesive, which can make the adhesive to react to the activator quickly. In some implementations, a limited amount of plasticizer is used because the plasticizer increases the sensitivity of the adhesive to moisture and the pre-processed fibers or lines need to be kept reasonably non-tacky so that they can be wound onto the bobbin readily. In some implementations, the manufacturing temperature and humidity of the pre-processed fibers or lines are controlled.

Based on various needs, such as a desired surface tack, other components can be added either in the manufacturing process of the lines or fibers, or post-manufacturing prior to using in the hand-held tool. Suitable additional components can include calcium carbonate, talc, chalk, and corn starch. The additional components can be in the form of particles, and the effectiveness of these additional components can be altered by altering the particle size or by using a combination of different particle sizes.

The activators can include the same or different materials as the adhesive. For example, an activator can contain multiple tackifiers. The total amount of tackifiers or the concentration/amount of each tackifier in the activator can be adjusted to produce certain properties or performance based on, e.g., viscosity and or Tg of the tackifiers. The total amount of tackifiers in the activator can be about 1 wt % to about 15 wt % in the activator.

Additional harsher components can be added into the adhesive or the activator when needed.

A wide variety of additives can be included in or supplement the adhesive or activator or any other component of any system used to attach the line to the target surface. The additives can serve a wide variety of functions including to make the component longer lasting, easier to apply, environmentally friendlier, or safer, or any combination of those. In addition, additives can impart aesthetic features to the components or to the attached fiber or both.

For example, pigments, dyes, or other color additives, or combinations of them, can be used. The color or colors can be chosen to match, complement, or contrast with one of more colors that appear on the target surface. Additives can also produce textures, non-color visible qualities, tactile feels, or other characteristics that are useful for purposes of aesthetics or decoration. Additives could also include fragrances. Additives and other components may be introduced into the adhesive and/or the activator. For example, the additive can be in an encapsulated or micro encapsulated format. The additive can be contained in one or more glass spheres. The glass spheres can be crushed when they passes through the activation chamber or when they are pressed onto the target surface by the application wheel to release the additive or curing agent contained in the glass spheres.

Tracers or tracer materials including metallic tracers and fluorescent materials, for example, can be included in the system used to attach the line to the target surface. The tracers make it easier to locate and follow the path of the line attached to the surface.

The target surface is often described above as related to a building, in particular the interior target surfaces of a building. However a very broad range of surfaces could be target surfaces for attaching the line. The target surfaces could include any surface of any kind of building or structure, interior or exterior, or internal to walls or other elements of the structure or building. The target surface need not be on a building or structure but could also be on furniture, fixtures, containers, trees, plants, building materials, automobiles or other vehicles, or combinations of them, among other things. The surface can be part of a new building or structure or an old one which the line is being added. The target surface can be exposed or hidden.

In some versions for residential use, the pre-coated adhesive can be water soluble. For some commercial uses, a two-component adhesive (such as an epoxy adhesive) may be provided with one component on the fiber itself and the second component, applied at the place of installation, serving as the activator.

In some cases, both an adhesive, or a first component of a two-part adhesive and then the adhesive activator or second part of the two-part adhesive could be applied, on demand, by the installation tool to an uncoated fiber by passing the fiber through two chambers. The activator may have a viscosity that is thick enough not to drip from the fiber during or after installation.

In some implementations, the fiber cable can be pre-coated with a liquid adhesive material that remains liquid until exposed to air. The cartridges containing such fibers or optical cables would not be opened until installation. The fiber would be applied almost immediately after being dispensed so that the fiber will cling to the target surface and then dry quickly.

The applications for which the line that is applied to the target surface can be used fall into a broad range and include, for example, telephone, Internet, television, security, home automation control and other low voltage applications. In some cases the applications could involve do-it-yourself projects of home or apartment dwellers, for example, for home theaters, great rooms, and family rooms or basements. In the industrial realm, the applications could include malls, manufacturing facilities, military facilities, security systems, communications systems, and others. Heavier duty applications may require stronger adhesive systems using urethane or epoxy adhesive components, for example.

In some residential complexes such as apartments, a larger fiber cable can be laid within a common area such as a hallway or stairway. An individual line of the cable can then enter each apartment, and be terminated anywhere within the apartment.

While the foregoing represents preferred embodiments of the invention, it will be understood by those skilled in the art that various modifications, additions, or changes may be made without departing from the spirit and scope of the invention, and that the invention includes all such modifications, additions, and changes as lie within the scope of the following claims.

We claim:

1. A method of attaching a communication line along a selected surface of a building, comprising:
   applying an adhesive coating over a supplied length of the communication line, the adhesive coating acquiring a dry or non-tacky state;
   storing the adhesive coated length of the communication line on a spool or reel when the coating acquires the dry or non-tacky state;
   paying out the coated length of the communication line from the spool or reel and applying the line along the selected surface using an applicator tool, while simultaneously activating the adhesive coating with an activator solution that causes the communication line to become temporarily tacky and to attach to the surface;
   providing a cartridge for containing the activator solution; and
   configuring the applicator tool to (i) house the spool or reel storing the coated length of the communication line, and (ii) house the cartridge containing the activator solution.

2. The method of claim 1, including formulating the activator solution to include water.

3. The method of claim 1, including formulating the activator solution to include a solvent.

4. The method of claim 3, including selecting components of the solvent from among one or more of (a) water, (b) ammonia, (c) alcohol, (d) acetone, (e) boric acid, and (f) acrylic polymers.

5. The method of claim 1, including providing the communication line in the form of an optical fiber or cable.

6. The method of claim 5, including providing the optical fiber or cable is round with a diameter of approximately 900 microns.

7. The method of claim 1, including selecting components of the adhesive coating from among one or more of (a) oxygenated solvents including alcohols, glycol ethers, ketones, esters, and glycol ether esters, (b) hydrocarbon solvents including aliphatic and aromatic hydrocarbons, and (c) halogenated solvents including chlorinated hydrocarbons.

* * * * *